(12) United States Patent
Kakutani et al.

(10) Patent No.: US 6,299,283 B1
(45) Date of Patent: Oct. 9, 2001

(54) DOT RECORDING USING PLURAL SUB-SCAN FEED AMOUNTS

(75) Inventors: Toshiaki Kakutani; Kazumichi Shimada, both of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/147,364

(22) PCT Filed: Apr. 7, 1998

(86) PCT No.: PCT/JP98/01607

§ 371 Date: Dec. 8, 1998

§ 102(e) Date: Dec. 8, 1998

(87) PCT Pub. No.: WO98/45121

PCT Pub. Date: Oct. 15, 1998

(30) Foreign Application Priority Data

Apr. 8, 1997 (JP) ................................... 9-106734

(51) Int. Cl.[7] .............. B41J 2/145; B41J 2/15; B41J 29/38
(52) U.S. Cl. ................................. 347/41; 347/16
(58) Field of Search ................... 347/15, 41, 9, 347/16

(56) References Cited

U.S. PATENT DOCUMENTS

| 4,540,996 | * | 9/1985 | Saito | 347/43 |
| 4,920,355 | * | 4/1990 | Katerberg | 347/43 |
| 5,790,150 | * | 8/1998 | Lidke et al. | 347/15 |
| 6,086,181 | * | 7/2000 | Majette et al. | 347/16 |

FOREIGN PATENT DOCUMENTS

| 58-194541A | 11/1983 | (JP) . |
| 3-45350A | 2/1991 | (JP) . |
| 3-45351A | 2/1991 | (JP) . |

* cited by examiner

Primary Examiner—Thinh Nguyen
(74) Attorney, Agent, or Firm—Oblon, Spivak, McClelland, Maier & Neustadt, P.C.

(57) ABSTRACT

Integers that are no less than 2 and relatively prime are selected for the nozzle pitch k and the number of effective nozzles Neff which represents the net number of raster lines in a main scanning direction recorded by one main scan,. A plurality of different values are used in combination for the sub-scan feed amount L. It is preferable to select the plurality of different values for the sub-scan feed amount L in such a manner that the offset G, which is a remainder obtained by dividing each value by the nozzle pitch k, is fixed to a constant value. The offset G preferably takes a value in the range of 2 to (k−2).

20 Claims, 21 Drawing Sheets

Fig. 5(A) ARRANGEMENT OF NOZZLE ARRAYS
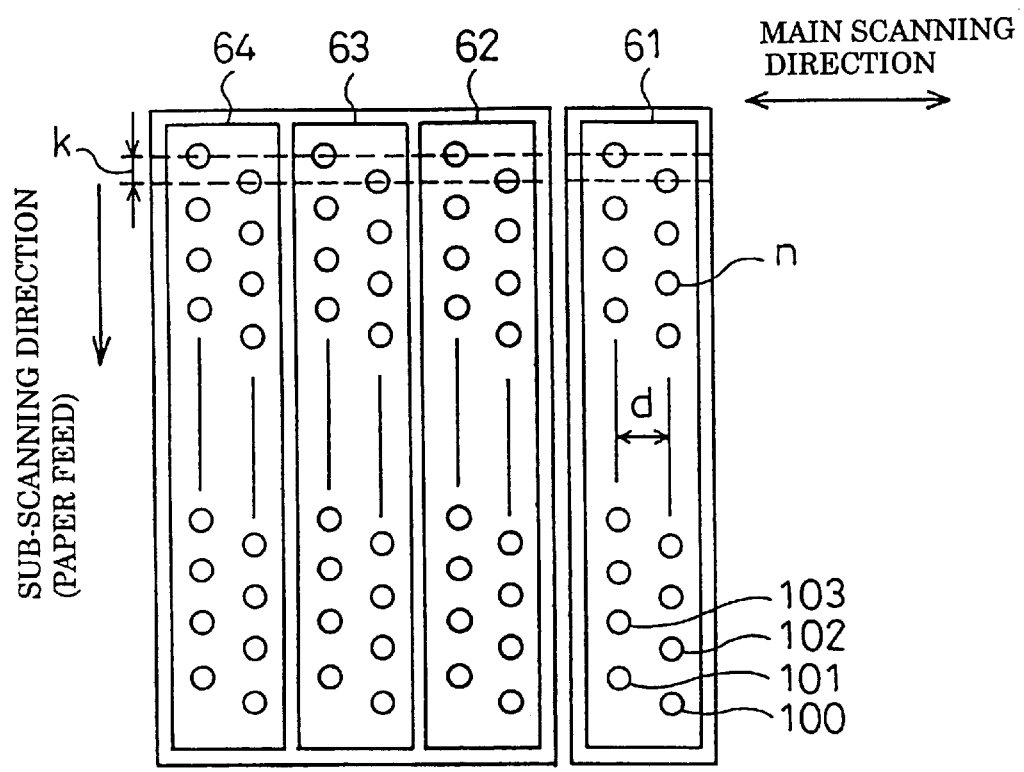
Fig. 5(B) DOTS FORMED BY ONE NOZZLE ARRAY
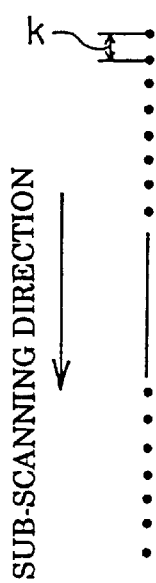

Fig. 6(A) CONCEPT OF SUB-SCAN FEED (s=1)
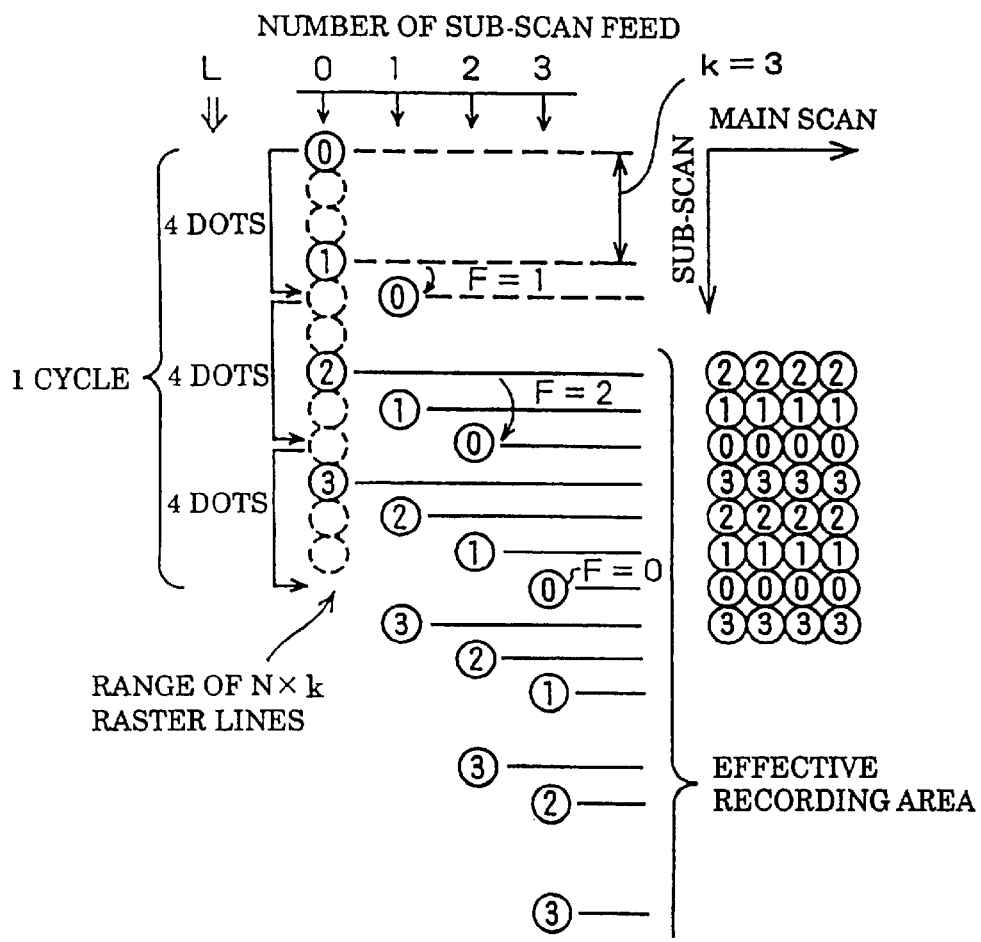
Fig. 6(B) PARAMETERS
NOZZLE PITCH k : 3 [dot]
NUMBER OF USED NOZZLES N : 4
NUMBER OF SCAN REPEATS s : 1
NUMBER OF EFFECTIVE NOZZLES Neff : 4
| NUMBER OF SUB-SCAN FEED | 0 | 1 | 2 | 3 |
|---|---|---|---|---|
| FEED AMOUNT L [dot] | 0 | 4 | 4 | 4 |
| ΣL | 0 | 4 | 8 | 12 |
| F = (ΣL) % k | 0 | 1 | 2 | 0 |

Fig. 7(A) CONCEPT OF SUB-SCAN FEED (s=2)
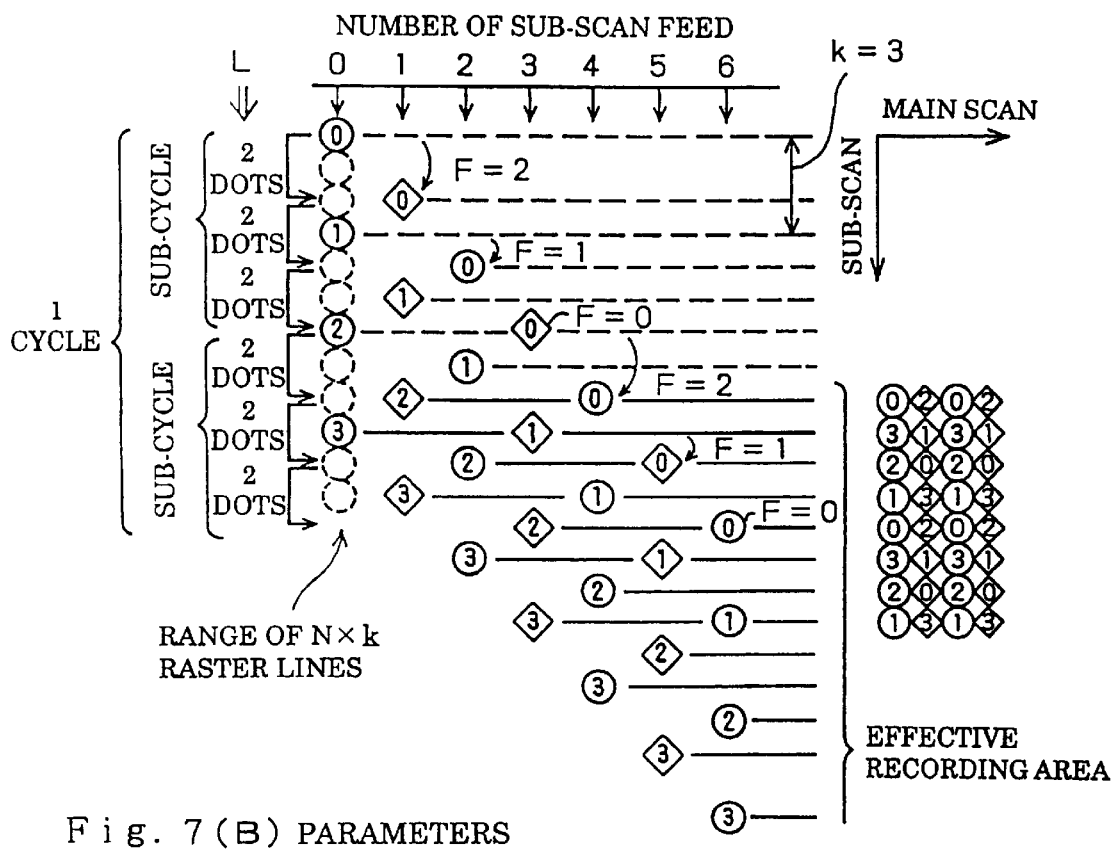
Fig. 7(B) PARAMETERS
NOZZLE PITCH k : 3 [dot]
NUMBER OF USED NOZZLES N : 4
NUMBER OF SCAN REPEATS s : 2
NUMBER OF EFFECTIVE NOZZLES Neff : 2
| NUMBER OF SUB-SCAN FEED | 0 | 1 | 2 | 3 | 4 | 5 | 6 |
|---|---|---|---|---|---|---|---|
| FEED AMOUNT L [dot] | 0 | 2 | 2 | 2 | 2 | 2 | 2 |
| $\Sigma L$ | 0 | 2 | 4 | 6 | 8 | 10 | 12 |
| $F = (\Sigma L) \% k$ | 0 | 2 | 1 | 0 | 2 | 1 | 0 |

SCAN PARAMETERS
NOZZLE PITCH k : 4 [dot]
NUMBER OF NOZZLES N : 8
NUMBER OF SCAN REPEATS s : 1
NUMBER OF EFFECTIVE NOZZLES Neff: 8

FIRST DOT RECORDING SCHEME

Fig. 9(A)  SCAN PARAMETERS

NOZZLE PITCH k : 4 [dot]
NUMBER OF USED NOZZLES N : 8
NUMBER OF SCAN REPEATS s : 1
NUMBER OF EFFECTIVE NOZZLES Neff : 8

| NUMBER OF SUB-SCAN FEED | 0 | 1 | 2 | 3 | 4 |
|---|---|---|---|---|---|
| FEED AMOUNT L [dot] | 0 | 10 | 7 | 6 | 9 |
| $\Sigma$ L | 0 | 10 | 17 | 23 | 32 |
| F = ($\Sigma$ L) % k | 0 | 2 | 1 | 3 | 0 |
| G = L % k | 0 | 2 | 3 | 2 | 1 |

Fig. 9(B)  RASTER NUMBERS OF EFFECTIVE RASTER LINES RECORDED BY RESPECTIVE NOZZLES

```
           NUMBER OF SUB-SCAN FEED
NOZZLE    0   1   2   3   4    5    6    7
   #0:    .   .   .   4  13   23   30  (36)
   #1:    .   .   2   8  17   27  (34) (40)
   #2:    .   .   6  12  21   31  (38) (44)
   #3:    .   3  10  16  25  (35) (42) (48)
   #4:    .   7  14  20  29  (39) (46) (52)
   #5:    1  11  18  24 (33) (43) (50) (56)
   #6:    5  15  22  28 (37) (47) (54) (60)
   #7:    9  19  26  32 (41) (51) (58) (64)
```

Fig. 10

NOZZLE NUMBERS FOR RECORDING RESPECTIVE RASTER LINES
(FIRST DOT RECORDING SCHEME)

| RASTER | @ | Δ | 0 | 1 | 2 | 3 | 4 | 5 | 6 |
|---|---|---|---|---|---|---|---|---|---|
| | | | colspan="7" align="center" | NUMBER OF SUB-SCAN FEED | | | | | |
| 1 | • | – | #5 | | | | | | |
| 2 | X | 2 | | | #1 | | | | |
| 3 | • | – | | #3 | | | | | |
| 4 | X | 3 | | | | #0 | | | |
| 5 | • | – | #6 | | | | | | |
| 6 | X | 2 | | | #2 | | | | |
| 7 | • | – | | #4 | | | | | |
| 8 | X | 3 | | | | #1 | | | |
| 9 | • | – | #7 | | | | | | |
| 10 | X | 2 | | | #3 | | | | |
| 11 | • | – | | #5 | | | | | |
| 12 | ↑ | 2 | | | | #2 | | | |
| 13 | X | 2 | | | | | #0 | | |
| 14 | ↓ | 1 | | | #4 | | | | |
| 15 | • | – | | #6 | | | | | |
| 16 | ↑ | 2 | | | | #3 | | | |
| 17 | X | 2 | | | | | #1 | | |
| 18 | ↓ | 1 | | | #5 | | | | |
| 19 | • | – | | #7 | | | | | |
| 20 | ↑ | 2 | | | | #4 | | | |
| 21 | X | 2 | | | | | #2 | | |
| 22 | • | – | | | #6 | | | | |
| 23 | X | 3 | | | | | | #0 | |
| 24 | • | – | | | | #5 | | | |
| 25 | X | 2 | | | | | #3 | | |
| 26 | • | – | | | #7 | | | | |
| 27 | X | 3 | | | | | | #1 | |
| 28 | • | – | | | | #6 | | | |
| 29 | ↑ | 1 | | | | | #4 | | |
| 30 | X | 2 | | | | | | | #0 |
| 31 | ↓ | | | | | | | #2 | |

SECOND DOT RECORDING SCHEME

Fig. 11(A)   SCAN PARAMETERS

NOZZLE PITCH k : 4 [dot]
NUMBER OF NOZZLES N : 8
NUMBER OF SCAN REPEATS s : 1
NUMBER OF EFFECTIVE NOZZLES Neff : 8

| NUMBER OF SUB-SCAN FEED | 0 | 1 | 2 | 3 | 4 |
|---|---|---|---|---|---|
| FEED AMOUNT L [dot] | 0 | 7 | 6 | 9 | 10 |
| $\Sigma L$ | 0 | 7 | 13 | 22 | 32 |
| $F = (\Sigma L) \% k$ | 0 | 3 | 1 | 2 | 0 |
| $G = L \% k$ | 0 | 3 | 2 | 1 | 2 |

Fig. 11(B)   RASTER NUMBERS OF EFFECTIVE RASTER LINES RECORDED BY RESPECTIVE NOZZLES

```
            NUMBER OF SUB-SCAN FEED
NOZZLE  0    1    2    3    4    5    6    7
 #0:    .    .    .    4   14   21   27  (36)
 #1:    .    .    .    8   18   25   31  (40)
 #2:    .    .    3   12   22   29  (35)
 #3:    .    1    7   16   26  (33)
 #4:    .    5   11   20   30  (37)
 #5:    2    9   15   24  (34)
 #6:    6   13   19   28  (38)
 #7:   10   17   23   32  (42)
```

Fig. 12

NOZZLE NUMBERS FOR RECORDING RESPECTIVE RASTER LINES
(SECOND DOT RECORDING SCHEME)

| RASTER | @ | Δ | 0 | 1 | 2 | 3 | 4 | 5 | 6 |
|---|---|---|---|---|---|---|---|---|---|
| 1 | ↓ | 1 | | #3 | | | | | |
| 2 | • | – | #5 | | | | | | |
| 3 | ↑ | 2 | | | #2 | | | | |
| 4 | X | 2 | | | | #0 | | | |
| 5 | ↓ | 1 | | #4 | | | | | |
| 6 | • | – | #6 | | | | | | |
| 7 | ↑ | 2 | | | #3 | | | | |
| 8 | X | 2 | | | | #1 | | | |
| 9 | ↓ | 1 | | #5 | | | | | |
| 10 | • | – | #7 | | | | | | |
| 11 | ↑ | 2 | | | #4 | | | | |
| 12 | X | 2 | | | | #2 | | | |
| 13 | • | – | | #6 | | | | | |
| 14 | X | 3 | | | | | #0 | | |
| 15 | • | – | | | #5 | | | | |
| 16 | X | 2 | | | | #3 | | | |
| 17 | • | – | | #7 | | | | | |
| 18 | X | 3 | | | | | #1 | | |
| 19 | • | – | | | #6 | | | | |
| 20 | ↑ | 1 | | | | #4 | | | |
| 21 | X | 2 | | | | | | #0 | |
| 22 | ↓ | 2 | | | | | #2 | | |
| 23 | • | – | | | #7 | | | | |
| 24 | ↑ | 1 | | | | #5 | | | |
| 25 | X | 2 | | | | | | #1 | |
| 26 | • | – | | | | | #3 | | |
| 27 | X | 3 | | | | | | | #0 |
| 28 | • | – | | | | #6 | | | |
| 29 | X | 2 | | | | | | #2 | |
| 30 | • | – | | | | | #4 | | |
| 31 | X | 3 | | | | | | | #1 |
| 32 | • | | | | | #7 | | | |

THIRD DOT RECORDING SCHEME

Fig. 13(A) SCAN PARAMETERS

NOZZLE PITCH k : 8 [dot]
NUMBER OF NOZZLES N : 16
NUMBER OF SCAN REPEATS s : 1
NUMBER OF EFFECTIVE NOZZLES Neff : 16

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 13 | 21 | 13 | 13 | 21 | 13 | 21 | 13 |
| ΣL | 0 | 13 | 34 | 47 | 60 | 81 | 94 | 115 | 128 |
| F = (ΣL) % k | 0 | 5 | 2 | 7 | 4 | 1 | 6 | 3 | 0 |
| G = L % k | 0 | 5 | 5 | 5 | 5 | 5 | 5 | 5 | 5 |

Fig. 13(B) RASTER NUMBERS OF EFFECTIVE RASTER LINES RECORDED BY RESPECTIVE NOZZLES

```
           NUMBER OF SUB-SCAN FEED
NOZZLE 0   1   2   3   4   5   6   7   8   9  10  11  12  13  14   15
# 0:  .   .   .   .   .   .   .   8  21  34  55  68  81 102 115 (136)
# 1:  .   .   .   .   .   .   .  16  29  42  63  76  89 110 123 (144)
# 2:  .   .   .   .   .   .   3  24  37  50  71  84  97 118 (131)
# 3:  .   .   .   .   .   .  11  32  45  58  79  92 105 126 (139)
# 4:  .   .   .   .   .   6  19  40  53  66  87 100 113 (134)
# 5:  .   .   .   .   .  14  27  48  61  74  95 108 121 (142)
# 6:  .   .   .   .   1  22  35  56  69  82 103 116 (129)
# 7:  .   .   .   .   9  30  43  64  77  90 111 124 (137)
# 8:  .   .   .   4  17  38  51  72  85  98 119 (132)
# 9:  .   .   .  12  25  46  59  80  93 106 127 (140)
#10:  .   .   7  20  33  54  67  88 101 114 (135)
#11:  .   .  15  28  41  62  75  96 109 122 (143)
#12:  .   2  23  36  49  70  83 104 117 (130)
#13:  .  10  31  44  57  78  91 112 125 (138)
#14:  5  18  39  52  65  86  99 120 (133)
#15: 13  26  47  60  73  94 107 128 (141)
```

Fig. 14

NOZZLE NUMBERS FOR RECORDING RESPECTIVE RASTER LINES
(THIRD DOT RECORDING SCHEME)

| RASTER | @ | Δ | 0 | 1 | 2 | 3 | 4 | 5 | 6 | 7 | 8 |
|---|---|---|---|---|---|---|---|---|---|---|---|
| 1 | ↓ | 3 | | | | | #6 | | | | |
| 2 | · | – | | #12 | | | | | | | |
| 3 | X | 5 | | | | | | | #2 | | |
| 4 | ↓ | 3 | | | | #8 | | | | | |
| 5 | · | – | #14 | | | | | | | | |
| 6 | X | 5 | | | | | | #4 | | | |
| 7 | · | – | | | #10 | | | | | | |
| 8 | X | 5 | | | | | | | | #0 | |
| 9 | ↓ | 3 | | | | | #7 | | | | |
| 10 | · | – | | #13 | | | | | | | |
| 11 | X | 5 | | | | | | | #3 | | |
| 12 | ↓ | 3 | | | | #9 | | | | | |
| 13 | · | – | #15 | | | | | | | | |
| 14 | X | 5 | | | | | | #5 | | | |
| 15 | · | – | | | #11 | | | | | | |
| 16 | X | 5 | | | | | | | | #1 | |
| 17 | ↓ | 3 | | | | #8 | | | | | |
| 18 | · | – | | #14 | | | | | | | |
| 19 | X | 5 | | | | | | | #4 | | |
| 20 | · | – | | | | #10 | | | | | |
| 21 | X | 5 | | | | | | | | | #0 |
| 22 | ↓ | 3 | | | | | | #6 | | | |
| 23 | · | – | | | #12 | | | | | | |
| 24 | X | 5 | | | | | | | | #2 | |
| 25 | ↓ | 3 | | | | | #9 | | | | |
| 26 | · | – | | #15 | | | | | | | |
| 27 | X | 5 | | | | | | #5 | | | |
| 28 | · | – | | | | #11 | | | | | |
| 29 | X | 5 | | | | | | | | | #1 |
| 30 | ↓ | 3 | | | | | | #7 | | | |
| 31 | · | – | | | #13 | | | | | | |
| 32 | X | 5 | | | | | | | | #3 | |

Fig. 15

NOZZLE NUMBERS FOR RECORDING RESPECTIVE RASTER LINES
(WHEN OFFSET G OF SUB-SCAN FEED L IS A CONSTANT, 1)

| RASTER | @ | Δ | \multicolumn{9}{c}{NUMBER OF SUB-SCAN FEED} |

| RASTER | @ | Δ | 0 | 1 | 2 | 3 | 4 | 5 | 6 | 7 | 8 |
|---|---|---|---|---|---|---|---|---|---|---|---|
| 1 | • | – | #14 | | | | | | | | |
| 2 | ↑ | 1 | | #12 | | | | | | | |
| 3 | ↑ | 1 | | | #10 | | | | | | |
| 4 | ↑ | 1 | | | | #8 | | | | | |
| 5 | ↑ | 1 | | | | | #6 | | | | |
| 6 | ↑ | 1 | | | | | | #4 | | | |
| 7 | ↑ | 1 | | | | | | | #2 | | |
| 8 | X | 7 | | | | | | | | #1 | |
| 9 | • | – | #15 | | | | | | | | |
| 10 | ↑ | 1 | | #13 | | | | | | | |
| 11 | ↑ | 1 | | | #11 | | | | | | |
| 12 | ↑ | 1 | | | | #9 | | | | | |
| 13 | ↑ | 1 | | | | | #7 | | | | |
| 14 | ↑ | 1 | | | | | | #5 | | | |
| 15 | ↑ | 1 | | | | | | | #3 | | |
| 16 | ↑ | 1 | | | | | | | | #2 | |
| 17 | X | 7 | | | | | | | | | #0 |
| 18 | • | – | | #14 | | | | | | | |
| 19 | ↑ | 1 | | | #12 | | | | | | |
| 20 | ↑ | 1 | | | | #10 | | | | | |
| 21 | ↑ | 1 | | | | | #8 | | | | |
| 22 | ↑ | 1 | | | | | | #6 | | | |
| 23 | ↑ | 1 | | | | | | | #4 | | |

Fig. 16

NOZZLE PITCH k AND DESIRABLE SUB-SCAN FEED OFFSET G

| NOZZLE PITCH k [dots] | PREFERABLE SUB-SCAN FEED OFFSET G |
|---|---|
| 8 | 3, 5 |
| 1 2 | 5, 7 |
| 1 6 | 3, 5, 7, 9. 1 1, 1 3 |

FOURTH DOT RECORDING SCHEME

Fig. 17(A)   SCAN PARAMETERS

NOZZLE PITCH k : 8 [dot]
NUMBER OF NOZZLES N : 16
NUMBER OF SCAN REPEATS s : 1
NUMBER OF EFFECTIVE NOZZLES Neff : 16

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 19 | 11 | 19 | 19 | 11 | 19 | 11 | 19 |
| $\Sigma L$ | 0 | 19 | 30 | 49 | 68 | 79 | 98 | 109 | 118 |
| $F = (\Sigma L) \% k$ | 0 | 3 | 6 | 1 | 4 | 7 | 2 | 5 | 0 |
| $G = L \% k$ | 0 | 3 | 3 | 3 | 3 | 3 | 3 | 3 | 3 |

Fig. 17(B) RASTER NUMBERS OF EFFECTIVE RASTER LINES RECORDED BY RESPECTIVE NOZZLES

```
              NUMBER OF SUB-SCAN FEED
NOZZLE  0   1   2   3   4   5   6   7   8   9  10  11  12  13   14     15
# 0:    .   .   .   .   .   .   .   .   8  27  46  57  76  95  106  125(136)
# 1:    .   .   .   .   .   .   .   5  16  35  54  65  84 103  114(133)
# 2:    .   .   .   .   .   .   .  13  24  43  62  73  92 111  122(141)
# 3:    .   .   .   .   .   .   2  21  32  51  70  81 100 119(130)
# 4:    .   .   .   .   .   .  10  29  40  59  78  89 108 127(138)
# 5:    .   .   .   .   .   7  18  37  48  67  86  97 116(135)
# 6:    .   .   .   .   .  15  26  45  56  75  94 105 124(143)
# 7:    .   .   .   .   4  23  34  53  64  83 102 113(132)
# 8:    .   .   .   .  12  31  42  61  72  91 110 121(140)
# 9:    .   .   .   1  20  39  50  69  80  99 118(129)
#10:    .   .   .   9  28  47  58  77  88 107 126(137)
#11:    .   .   6  17  36  55  66  85  96 115(134)
#12:    .   .  14  25  44  63  74  93 104 123(142)
#13:    .   3  22  33  52  71  82 101 112(131)
#14:    .  11  30  41  60  79  90 109 120(139)
#15:   19  38  49  68  87  98 117 128(147)
```

Fig. 18

RASTER NUMBERS OF EFFECTIVE RASTER LINES RECORDED BY RESPECTIVE NOZZLES
(FOURTH DOT RECORDING SCHEME)

| NOZZLE | @ | Δ | 0 | 1 | 2 | 3 | 4 | 5 | 6 | 7 | 8 |
|---|---|---|---|---|---|---|---|---|---|---|---|
| 1 | · | − | . | . | #9 | | | | | | |
| 2 | X | 5 | . | . | . | . | . | #3 | | | |
| 3 | · | − | #13 | | | | | | | | |
| 4 | ↑ | 3 | . | . | . | #7 | | | | | |
| 5 | X | 5 | . | . | . | . | . | . | #1 | | |
| 6 | · | − | . | #11 | | | | | | | |
| 7 | ↑ | 3 | . | . | . | . | #5 | | | | |
| 8 | X | 5 | . | . | . | . | . | . | . | #0 | |
| 9 | · | − | . | . | #10 | | | | | | |
| 10 | X | 5 | . | . | . | . | #4 | | | | |
| 11 | · | − | #14 | | | | | | | | |
| 12 | ↑ | 3 | . | . | . | #8 | | | | | |
| 13 | X | 5 | . | . | . | . | . | #2 | | | |
| 14 | · | − | . | #12 | | | | | | | |
| 15 | ↑ | 3 | . | . | . | . | #6 | | | | |
| 16 | X | 5 | . | . | . | . | . | . | #1 | | |
| 17 | · | − | . | . | #11 | | | | | | |
| 18 | X | 5 | . | . | . | . | . | #5 | | | |
| 19 | · | − | #15 | | | | | | | | |
| 20 | ↑ | 3 | . | . | . | . | #9 | | | | |
| 21 | X | 5 | . | . | . | . | . | . | #3 | | |
| 22 | · | − | . | #13 | | | | | | | |
| 23 | ↑ | 3 | . | . | . | . | #7 | | | | |
| 24 | X | 5 | . | . | . | . | . | . | . | #2 | |
| 25 | · | − | . | . | #12 | | | | | | |
| 26 | ↑ | 3 | . | . | . | . | . | #6 | | | |
| 27 | X | 5 | . | . | . | . | . | . | . | #0 | |
| 28 | · | − | . | . | . | #10 | | | | | |
| 29 | X | 5 | . | . | . | . | . | #4 | | | |
| 30 | · | − | . | #14 | | | | | | | |
| 31 | ↑ | 3 | . | . | . | . | #8 | | | | |
| 32 | X | | . | . | . | . | . | . | #3 | | |

Fig. 19

SCAN PARAMETERS OF FIFTH DOT RECORDING SCHEME

NOZZLE PITCH k : 8 [dot]
NUMBER OF NOZZLES N : 32
NUMBER OF SCAN REPEATS s : 2
NUMBER OF EFFECTIVE NOZZLES Neff : 16 (=N/s)

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 19 | 11 | 19 | 19 | 11 | 19 | 11 | 19 |
| $\Sigma L$ | 0 | 19 | 30 | 49 | 68 | 79 | 98 | 109 | 118 |
| $F = (\Sigma L) \% k$ | 0 | 3 | 6 | 1 | 4 | 7 | 2 | 5 | 0 |
| $G = L \% k$ | 0 | 3 | 3 | 3 | 3 | 3 | 3 | 3 | 3 |

| NOZZLE | NUMBER OF SUB-SCAN FEED | | | | | | | | | | | | | | | | | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| # 0: | . | . | . | . | . | . | . | . | . | . | . | . | . | . | . | -8 | -27 | -46 | -57 | -76 | -95 | -106 | -125 | -(136) |
| # 1: | . | . | . | . | . | . | . | . | . | . | . | . | . | . | -5 | -16 | -35 | -54 | -65 | -84 | -103 | -114 | -(133) | |
| # 2: | . | . | . | . | . | . | . | . | . | . | . | . | . | . | -13 | -24 | -43 | -62 | -73 | -92 | -111 | -122 | -(141) | |
| # 3: | . | . | . | . | . | . | . | . | . | . | . | . | . | -2 | -21 | -32 | -51 | -70 | -81 | -100 | -119 | -(130) | | |
| # 4: | . | . | . | . | . | . | . | . | . | . | . | . | -10 | -29 | -40 | -59 | -78 | -89 | -108 | -127 | -(138) | | | |
| # 5: | . | . | . | . | . | . | . | . | . | . | . | -7 | -18 | -37 | -48 | -67 | -86 | -97 | -116 | -(135) | | | | |
| # 6: | . | . | . | . | . | . | . | . | . | . | -15 | -26 | -45 | -56 | -75 | -94 | -105 | -124 | -(143) | | | | | |
| # 7: | . | . | . | . | . | . | . | . | . | -4 | -23 | -34 | -53 | -64 | -83 | -102 | -113 | -(132) | | | | | | |
| # 8: | . | . | . | . | . | . | . | . | . | -12 | -31 | -42 | -61 | -72 | -91 | -110 | -121 | -(140) | | | | | | |
| # 9: | . | . | . | . | . | . | . | . | -9 | -20 | -39 | -50 | -69 | -80 | -99 | -118 | -(129) | | | | | | | |
| #10: | . | . | . | . | . | . | . | -6 | -17 | -28 | -47 | -58 | -77 | -88 | -107 | -126 | -(137) | | | | | | | |
| #11: | . | . | . | . | . | . | . | -14 | -25 | -36 | -55 | -66 | -85 | -96 | -115 | -(134) | | | | | | | | |
| #12: | . | . | . | . | . | . | -3 | -22 | -33 | -44 | -63 | -74 | -93 | -104 | -123 | -(142) | | | | | | | | |
| #13: | . | . | . | . | . | . | -11 | -30 | -41 | -52 | -71 | -82 | -101 | -112 | -(131) | | | | | | | | | |
| #14: | . | . | . | . | . | . | -19 | -38 | -49 | -60 | -79 | -90 | -109 | -(139) | | | | | | | | | | |
| #15: | . | . | . | . | . | . | -8 | -19 | -38 | -68 | -87 | -98 | -117 | -128 | -(147) | | | | | | | | | |
| #16: | . | . | . | . | . | . | 8 | 27 | 46 | 57 | 76 | 95 | 106 | 125 | (136) | | | | | | | | | |
| #17: | . | . | . | . | . | 5 | 16 | 35 | 54 | 65 | 84 | 103 | 114 | (133) | | | | | | | | | | |
| #18: | . | . | . | . | . | 13 | 24 | 43 | 62 | 73 | 92 | 111 | 122 | (141) | | | | | | | | | | |
| #19: | . | . | . | . | 2 | 21 | 32 | 51 | 70 | 81 | 100 | 119 | (130) | | | | | | | | | | | |
| #20: | . | . | . | . | 10 | 29 | 40 | 59 | 78 | 89 | 108 | 127 | (138) | | | | | | | | | | | |
| #21: | . | . | . | 7 | 18 | 37 | 48 | 67 | 86 | 97 | 116 | (135) | | | | | | | | | | | | |
| #22: | . | . | . | 15 | 26 | 45 | 56 | 75 | 94 | 105 | 124 | (143) | | | | | | | | | | | | |
| #23: | . | . | 4 | 12 | 23 | 34 | 53 | 64 | 83 | 102 | 113 | (132) | | | | | | | | | | | | |
| #24: | . | . | 12 | 20 | 31 | 42 | 61 | 72 | 91 | 110 | 121 | (140) | | | | | | | | | | | | |
| #25: | . | 1 | 9 | 28 | 39 | 50 | 69 | 80 | 99 | 118 | (129) | | | | | | | | | | | | | |
| #26: | . | 9 | 17 | 36 | 47 | 58 | 77 | 88 | 107 | 126 | (137) | | | | | | | | | | | | | |
| #27: | 6 | 14 | 25 | 44 | 55 | 66 | 85 | 96 | 115 | (134) | | | | | | | | | | | | | | |
| #28: | 3 | 22 | 33 | 52 | 63 | 74 | 93 | 104 | 123 | (142) | | | | | | | | | | | | | | |
| #29: | 11 | 22 | 41 | 60 | 71 | 82 | 101 | 112 | (131) | | | | | | | | | | | | | | | |
| #30: | 19 | 30 | 49 | 68 | 79 | 90 | 109 | 120 | (139) | | | | | | | | | | | | | | | |
| #31: | 19 | 38 | 49 | 68 | 87 | 98 | 117 | 128 | (147) | | | | | | | | | | | | | | | |

RASTER NUMBERS OF EFFECTIVE RASTER LINES RECORDED BY RESPECTIVE NOZZLES
(FIFTH DOT RECORDING SCHEME)

| NOZZLE | @ | Δ | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|---|
| 1 | · | - | | | #25 | | | | | | | | -#9 | | | | | | |
| 2 | X | 5 | | | | | | #19 | | | | | | | -#3 | | | | |
| 3 | · | - | #29 | | | | | | | -#13 | | | | | | | | | |
| 4 | ↑ | 3 | | | | #23 | | | | | | | | -#7 | | | | | |
| 5 | X | 5 | | | | | | | #17 | | | | | | | | -#1 | | |
| 6 | · | - | | #27 | | | | | | -#11 | | | | | | | | | |
| 7 | ↑ | 3 | | | | | #21 | | | | | | | | -#5 | | | | |
| 8 | X | 5 | | | | | | | | #16 | | | | | | | | -#0 | |
| 9 | · | - | | | #26 | | | | | | -#10 | | | | | | | | |
| 10 | X | 5 | | | | | | #20 | | | | | | | | -#4 | | | |
| 11 | · | - | #30 | | | | | | | | -#14 | | | | | | | | |
| 12 | ↑ | 3 | | | | #24 | | | | | | | | | -#8 | | | | |
| 13 | X | 5 | | | | | | | #18 | | | | | | | | | -#2 | |
| 14 | · | - | | #28 | | | | | | | -#12 | | | | | | | | |
| 15 | ↑ | 3 | | | | | #22 | | | | | | | | | -#6 | | | |
| 16 | X | 5 | | | | | | | | #17 | | | | | | | | | -#1 |
| 17 | · | - | | | #27 | | | | | | | -#11 | | | | | | | |
| 18 | X | 5 | | | | | | #21 | | | | | | | | | -#5 | | |
| 19 | · | - | #31 | | | | | | | | | -#15 | | | | | | | |
| 20 | ↑ | 3 | | | | | #25 | | | | | | | | | -#9 | | | |
| 21 | X | 5 | | | | | | | #19 | | | | | | | | | -#3 | |
| 22 | · | - | | #29 | | | | | | | | -#13 | | | | | | | |
| 23 | ↑ | 3 | | | | | | #23 | | | | | | | | -#7 | | | |
| 24 | X | 5 | | | | | | | | #18 | | | | | | | | | -#2 |
| 25 | · | - | | | #28 | | | | | | | | -#12 | | | | | | |
| 26 | ↑ | 3 | | | | | | #22 | | | | | | | | | -#6 | | |
| 27 | X | 5 | | | | | | | | #16 | | | | | | | | | -#0 |
| 28 | · | - | | | | #26 | | | | | | -#10 | | | | | | | |
| 29 | X | 5 | | | | | | | #20 | | | | | | | | | -#4 | |
| 30 | · | - | | #30 | | | | | | | | | -#14 | | | | | | |
| 31 | ↑ | 3 | | | | | | #24 | | | | | | | | -#8 | | | |
| 32 | X | | | | | | | | #19 | | | | | | | | | -#3 | |

DOT RECORDING USING PLURAL SUB-SCAN FEED AMOUNTS

BACKGROUND OF THE INVENTION

The present invention relates to a technique of recording dots on the surface of a printing medium with a dot recording head.

DISCUSSION OF THE BACKGROUND

Serial scan-type printers and drum scan-type printers are dot recording devices which record dots with a recording head while carrying out scans both in a main scanning direction and a sub-scanning direction. There is a technique called the "interlace scheme", which is taught by U.S. Pat. No. 4,198,642 and Japanese Patent Laid-Open Gazette No. 53-2040, for improving the image quality of printers of this type, especially ink jet printers.

FIG. 22 is a diagram for explaining an example of the interlace scheme. In this specification, the following parameters are used to define a printing scheme.

N: Number of nozzles;
k: Nozzle pitch [dots];
s: Number of scan repeats;
D: Nozzle density [nozzles/inch];
L: Sub-scanning pitch [dots] or [inch];
w: Dot pitch [inch].

The number of nozzles N is the number of nozzles actually used to form dots. In the example of FIG. 22, N=3. The nozzle pitch k is the interval between the centers of the recording head nozzles expressed in units of the recorded image pitch (dot pitch w). In the example of FIG. 22, k=2. The number of scan repeats s is the number of main scans in which all dot positions on a main scanning line are serviced. In the example of FIG. 22, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the recording head. The sub-scanning pitch L (inch) is the distance moved in 1 sub-scan. The dot pitch w (inch) is the pitch of the dots in the recorded image. In general, it holds that $w=1/(D \cdot k)$, $k=1/(D \cdot w)$.

The circles containing two-digit numerals in FIG. 22 indicate dot recording positions. As indicated in the legend, the numeral on the left in each circle indicates the nozzle number and the numeral on the right indicates the recording order (the number of the main scan in which it was recorded).

The interlace scheme shown in FIG. 22 is characterized by the configuration of the nozzle array of the recording head and the sub-scanning method. Specifically, in the interlace scheme, the nozzle pitch k indicating the interval between the centers of adjacent nozzles is defined as an integer not smaller than 2, while the number of nozzles N and the nozzle pitch k are selected as integers which are relatively prime. Further, sub-scanning pitch L is set at a constant value given by $N/(D \cdot k)$.

The interlace scheme makes irregularities in nozzle pitch and ink jetting Feature to thin out over the recorded image. Because of this, it improves image quality by mitigating the effect of any irregularity that may be present in the nozzle pitch, the jetting Feature and the like.

The "overlap scheme", also known as the "multi-scan scheme", taught for example by Japanese Patent Laid-Open Gazette No. 3-207665 and Japanese Patent Publication Gazette No. 4-19030 is another technique used to improve image quality in color ink jet printers.

FIG. 23 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 23, a dot is formed at every second dot position. The timing of the driving of the nozzle sets is controlled so that the each nozzle set forms dots at different positions from the other in the main scanning direction. In other words, as shown in FIG. 23, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the nozzle pick k is set at an integer no less than 2, as in the interlace scheme. However, the number of nozzles N and the nozzle pitch k are not relatively prime, but the nozzle pitch k and the value N/s, which is obtained by dividing the number of nozzles N by the number of scan repeats s, are set at relatively prime integers instead.

In the overlap scheme, the dots of each main scanning line are not all recorded by the same nozzle but by multiple nozzles. Even when the nozzle features (pitch, jetting Feature etc.) are not completely uniform, therefore, enhanced image quality can be obtained because the features of the individual nozzles is prevented from affecting the entire main scanning line.

As described above, in the conventional interlace scheme, it is required that the number of nozzles N and the nozzle pitch k are set at relatively prime integers. In the overlap scheme, on the other hand, it is required that the quotient N/s, obtained by dividing the number of nozzles N by the number of scan repeats s, and the nozzle pitch k are set at relatively prime integers. The conventional techniques do not use all the nozzles disposed in the dot recording apparatus but use only part of the nozzles, in order to satisfy these requirements. In other words, the prior art techniques can not effectively utilize the nozzles disposed in the dot recording apparatus in some cases.

SUMMARY OF THE INVENTION

The present invention is made to solve the problem of the prior art, and an object of the present invention is to provide a dot recording apparatus and a method therefore that effectively utilize the nozzles disposed in the dot recording apparatus.

In order to solve at least part of the above problems, there is provided a dot recording apparatus for recording dots on a surface of a printing medium with a dot recording head. The dot recording apparatus comprises: a dot-forming element array arranged on the dot recording head to face the printing medium, the dot-forming element array comprising a plurality of dot-forming elements for forming a plurality of dots of an identical color at a substantially constant pitch in a sub-scanning direction; a main scan driving unit that drives at least one of the dot recording head and the printing medium to carry out main scan; a head driving unit that drives at least part of the plurality of dot-forming elements to form dots in the course of the main scan; a sub-scan driving unit that drives at least one of the dot recording head and the printing medium every time when the main scan is completed, thereby carrying out sub-scan; and a control unit that controls the above units.

The control unit controls the head driving unit such that the dot recording head is driven according to a condition that a number of effective dot-forming elements and an element pitch k are set at integers which are no less than 2 and which are not relatively prime, the number of effective dot-forming elements representing a net number of raster lines in a main scanning direction which can be recorded by one main scan, the element pitch k representing a pitch of the plurality of dot-forming elements expressed in unit of a number of dots. The control unit also controls the sub-scan driving unit such that a plurality of different values are used in combination for sub-scan feed amounts for a plurality of the sub-scan feeds, thereby enabling all raster lines included in an effective recording area of the printing medium to be recorded.

In the above dot recording apparatus, since the integers which are no less than 2 and which are relatively prime are selected for the number of effective dot-forming elements and the element pitch k, restriction on the number of working dot-forming elements is alleviated in many cases. As a result, the nozzles disposed in the dot recording apparatus can be utilized effectively.

In the above dot recording apparatus, it is preferable that the plurality of different values used for the sub-scan feed amounts are selected in such a manner that remainders obtained by dividing the respective values by the element pitch k are fixed to a constant value. This shifts the raster lines to be recorded by the nozzles by a constant amount of phase by every sub-scan feed where the phase is defined by the cyclic arrangement of the plurality of dot forming elements. As a result, an image can be recorded in a substantially regular manner, thereby improving the image quality.

It is preferable that the plurality of different values used for the sub-scan feed amounts are selected in such a manner that the remainders obtained 10 by dividing the respective values by the element pitch k are in a range of 2 to (k−2). The remainder obtained by dividing the sub-scan feed amount by the element pitch k may take a value in the range of 0 to (k−1), but when the remainder is equal to 1 or (k−1), adjoining raster lines are recorded in a successive manner. When the raster lines are recorded with ink, the successive recording of the adjoining raster lines may cause a blur of ink. The selection of the sub-scan feed amount to cause the remainder obtained by dividing the sub-scan feed amount by the element pitch k to be within the range of 2 to (k−2) effectively prevents this problem.

Moreover, it is preferable that, among a plurality of alternative sequences having an identical combination of the plurality of different values that are arranged in different orders, a sequence having smaller sub-scan feed amounts for a predetermined number of initial sub-scan feeds is selected to be used as a sequence of the different values for the sub-scan feed amounts. Use of this sequence enhances the possibility of starting the record of dots from the position closer to the end of the printing medium.

The control unit controls the head driving unit such that, the head driving unit drives the dot forming element array during each main scan at intermittent timings to disable dot formation for (s−1) dot positions among s consecutive dots in the main scanning direction where s is a predetermined integer of at least two; and the number of effective dot-forming elements is a value obtained by dividing, by the integer s, a number of dot-forming elements which are actually used for recording among the plurality of dot-forming elements. This arrangement enables the effects of the above apparatus to be attained not only when each raster line is recorded by one dot-forming element but when each raster line is recorded intermittently by s pieces of dot-forming elements.

The present invention is also directed to a method of recording dots on a surface of a printing medium with a dot recording head, the dot recording head having a dot-forming element array including a plurality of dot-forming elements for forming a plurality of dots of an identical color arranged at a substantially constant pitch in a sub-scanning direction. The method comprises the steps of: (a) driving at least one of the dot recording head and the printing medium to carry out main scan; (b) driving at least part of the plurality of dot-forming elements to form dots in the course of the main scan; and (c) driving at least one of the dot recording head and the printing medium every time when the main scan is concluded, thereby carrying out sub-scan.

In the step (b) the dot recording head is driven according to a condition that a number of effective dot-forming elements and an element pitch k are set at integers which are no less than 2 and which are not relatively prime, the number of effective dot-forming elements representing a net number of raster lines in a main scanning direction which can be recorded by one main scan, the element pitch k representing a pitch of the plurality of dot-forming elements expressed in unit of a number of dots. In the step (c) a plurality of different values are used in combination for sub-scan feed amounts for a plurality of the sub-scan feeds, thereby enabling all raster lines included in an effective recording area of the printing medium to be recorded. This method also enables the nozzles disposed in the dot recording apparatus to be utilized effectively.

The present invention is further directed to a computer program product storing a computer program for causing a printing apparatus to record dots on a surface of a printing medium while carrying out main scan in a direction substantially perpendicular to a sub-scanning direction, the printing apparatus comprising a dot recording head having a dot-forming element array including a plurality of dot-forming elements for forming a plurality of dots of an identical color arranged at a substantially constant pitch in the sub-scanning direction. The computer program product comprises: a computer readable medium; and a computer program stored on the computer readable medium. The computer program comprises: a first program code that causes a computer system to drive the dot recording head according to a condition that a number of effective dot-forming elements and an element pitch k are set at integers which are no less than 2 and which are not relatively prime, the number of effective dot-forming elements representing a net number of raster lines in a main scanning direction which can be recorded by one main scan, the element pitch k representing a pitch of the plurality of dot-forming elements expressed in unit of a number of dots; and a second program code that causes the computer system to use a plurality of different values in combination for sub-scan feed amounts for a plurality of the sub-scan feeds, thereby enabling all raster lines included in an effective recording area of the printing medium to be recorded.

BRIEF DESCRIPTION OF THE DRAWINGS

FIGS. 5(A) and 5(B) show an arrangement of ink jet nozzles on ink jet heads 61 through 64;

FIGS. 6(A) and 6(B) show the fundamental conditions of a general dot recording scheme when number of scan repeats s is equal to 1;

FIGS. 7(A) and 7(B) show the fundamental conditions of a general dot recording s me when the number of scan repeats s is no less than 2;

FIGS. 9(A) and 9(B) show shows the scan parameters and the raster numbers of the effective raster lines recorded by the respective nozzles in the first dot recording scheme;

FIG. 10 shows the nozzle numbers for recording the effective raster lines in the first dot recording scheme;

FIGS. 11(A) and 11(B) show the scan parameters and the raster numbers of the effective raster lines recorded by the respective nozzles in a second dot recording scheme;

FIG. 12 shows the nozzle numbers for recording the effective raster lines in the second dot recording scheme;

FIGS. 13(A) and 13(B) show the scan parameters and the raster numbers of the effective raster lines recorded by the respective nozzles in a third dot recording scheme;

FIG. 14 shows the nozzle numbers for recording the effective raster lines in the third dot recording scheme;

FIG. 15 shows an example of the dot recording scheme in which the offset G of the sub-scan feed amount L is fixed to a constant value;

FIG. 16 shows the preferable combinations of the nozzle pitch k and the offset G with respect to the sub-scan feed amount L;

FIGS. 17(A) and 17(B) show scan parameters and raster numbers of the effective raster lines recorded by the respective nozzles in a fourth dot recording scheme;

FIG. 18 shows the nozzle numbers for recording the effective raster lines in the fourth recording scheme;

FIG. 19 shows the scan parameters in a fifth dot recording scheme;

FIG. 20 shows the raster numbers of the effective raster lines recorded by the respective in the fifth dot recording scheme;

FIG. 21 shows the nozzle numbers for recording the effective raster lines in the fifth recording scheme;

DETAILED DESCRIPTION OF THE PREFERRED EMBODIMENTS

A. Structure of Apparatus

Figure 1:
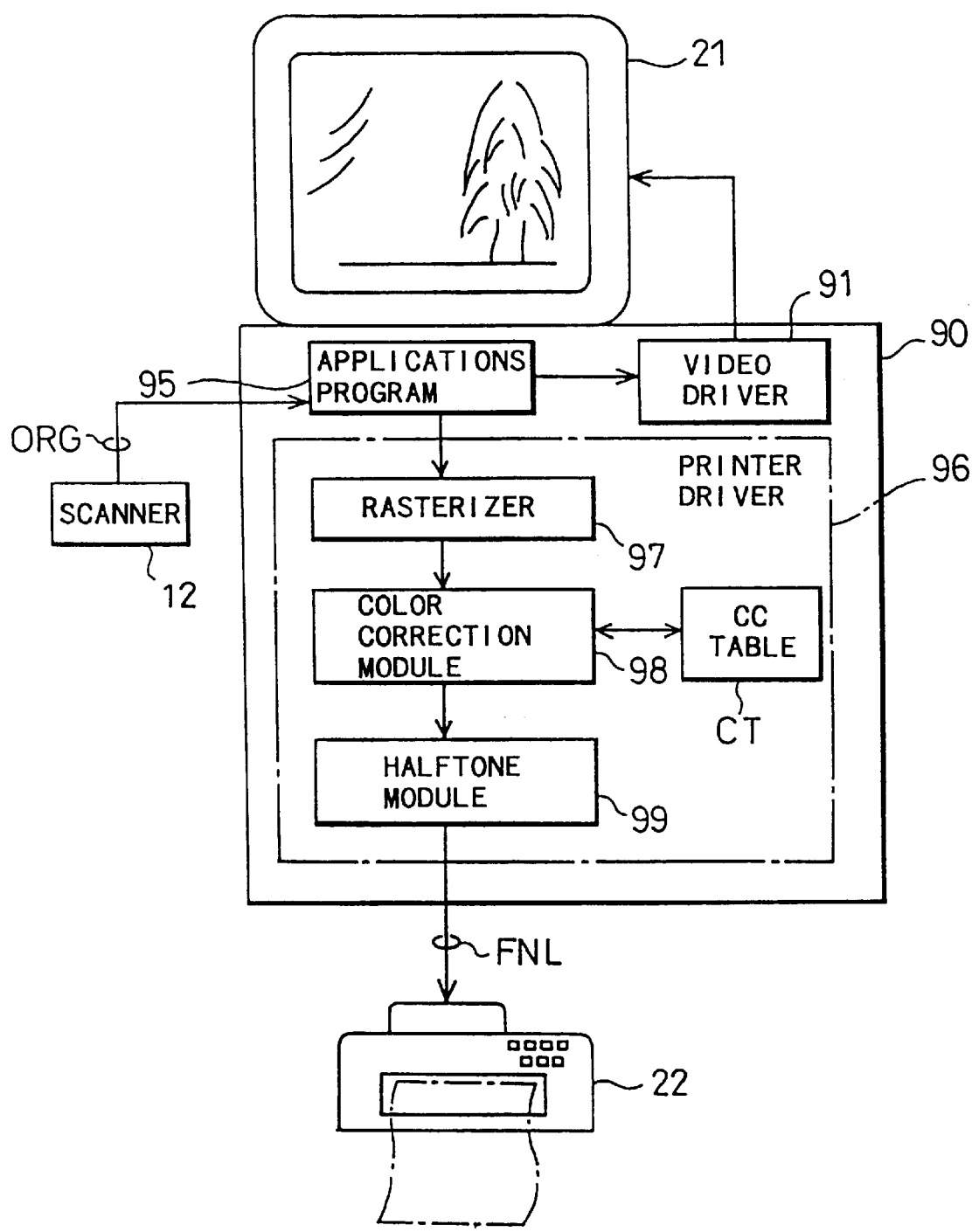
FIG. 1 is a block diagram schematically illustrating the structure of an image processing system embodying the present invention.

FIG. 1 is a block diagram illustrating the structure of a color image processing system embodying the present invention. The color image processing system includes a scanner 12, a personal computer 90, and a color printer 22. The personal computer 90 includes a color display 21. The scanner 21 captures color image data of a color original, and supplies the original color image data ORG, including R, G, and B components, to the computer 90.

The computer 90 is provided therein with CPU, RAM, and ROM (not shown), and an applications program 95 runs under a specific operating system. A video driver 91 and a printer driver 96 are incorporated in the operating system, and final color image data FNL of the applications program 95 are output through these drivers. The applications program 95 used for, for example, retouching an image, reads an image from the scanner, execute a prescribed processing, and displays the image on the CRT display 93 through the video driver 91. When the applications program 95 outputs a printing instruction, the printer driver 96 receives image information from the applications program 95 and converts the input image information to printing signals for the printer 22. (The printing signals are binarized signals for the respective colors of C, M, Y, and K.) In the example of FIG. 1, the printer driver 96 includes: a rasterizer 97 for converting the color image data processed by the applications program 95 to dot-based image data; a color correction module 98 for executing color correction on the dot-based image data according to the ink colors of C, M, and Y used by the printer 22 and the calorimetric features of the printer 22; a color correction table CT referred to by the color correction module 98; and a halftone module 99 for generating halftone image data, which represents image density in a particular area by on/off of ink in each dot, from the color-corrected image data.

Figure 2:
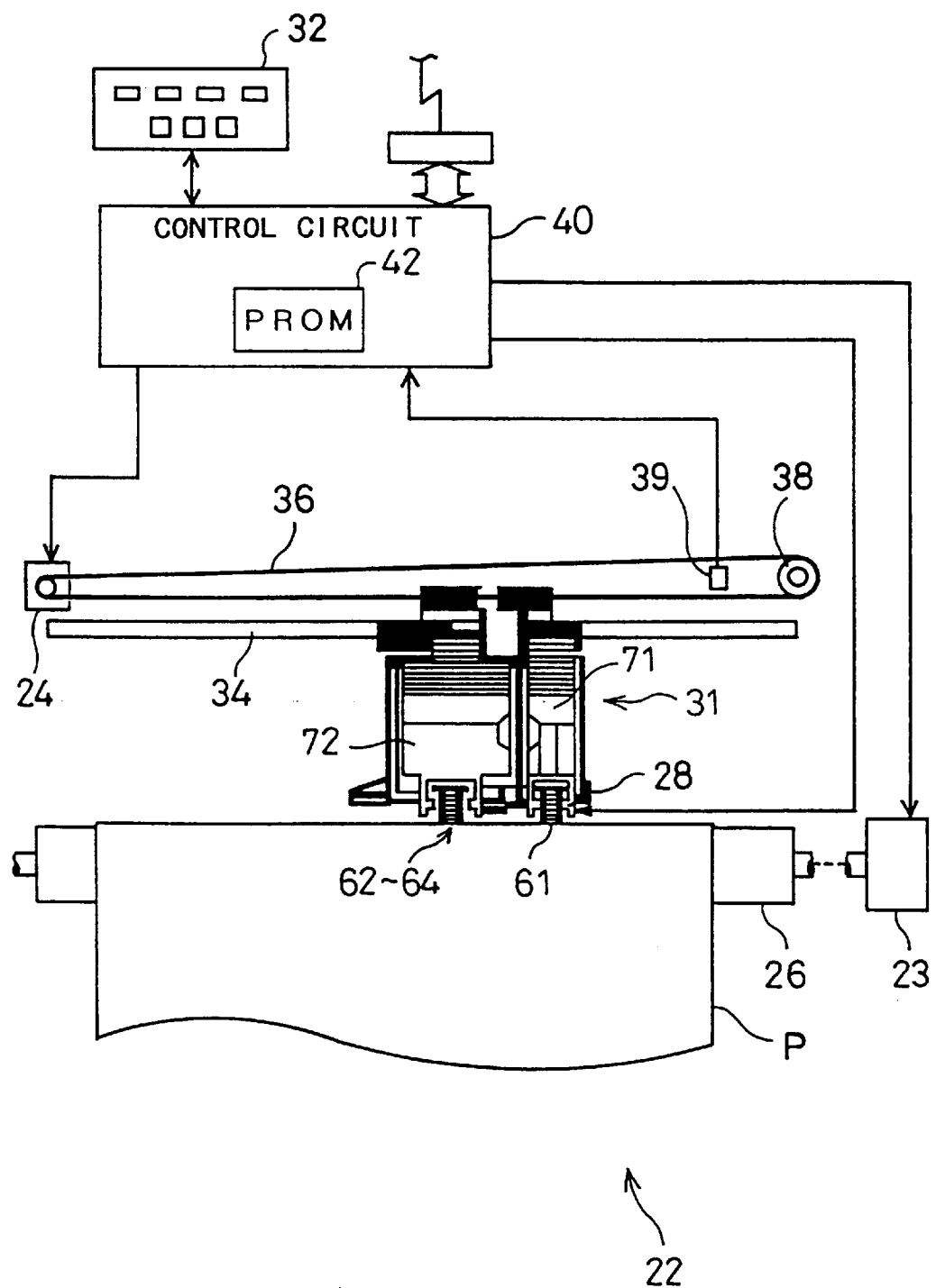
FIG. 2 schematically illustrates the structure of a color printer 22 as an example of the image output apparatus 20.

FIG. 2 schematically illustrates the structure of the printer 22. As shown in the drawing, the printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan, magenta, and yellow, may be mounted on the carriage 31 of the printer 22. Four ink discharge heads 61 through 64 are formed on the print head 28 that is disposed in the lower portion of the carriage 31, and ink supply conduits 65 (see FIG. 3) are formed in the bottom portion of the carriage 31 for leading supplies of ink from ink tanks to the respective ink discharge heads 61 through 64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61 through 64.

Figure 3:
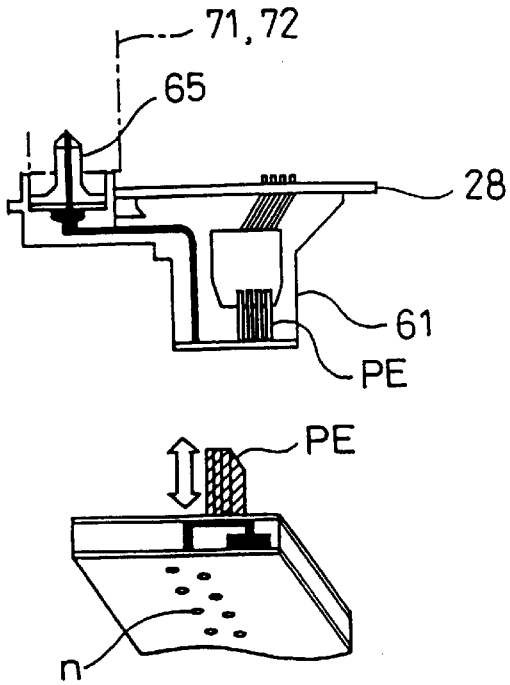
FIG. 3 illustrates the structure of a print head 28.

The following briefly describes the mechanism of discharging ink. When the ink cartridges 71 and 72 are attached to the carriage 31, inks in the ink cartridges 71 and 72 are sucked out through the ink supply conduits 65 by capillarity and are led to the ink discharge heads 61 through 64 formed in the print head 28 arranged in the lower portion of the carriage 31 as shown in FIG. 3. When the ink cartridges 71 and 72 are attached to the carriage 31, a pump works to suck first supplies of ink into the respective ink discharge heads 61 through 64. In this embodiment, the structures of the pump for suction and a cap for covering the print head 28 during the suction are not illustrated nor described specifically.

Figure 4:
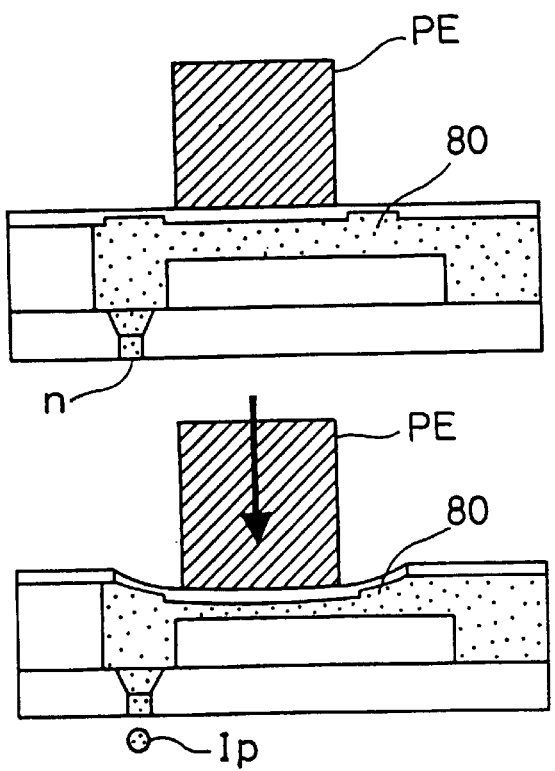
FIG. 4 shows the principle of ink jet.

An array of thirty-two nozzles "n" is formed in each of the ink discharge heads 61 through 64 as shown in FIG. 3. A piezoelectric element PE, which is one of electrically distorting elements and has an excellent response, is provided for each nozzle "n". FIG. 4 illustrates a configuration of the piezoelectric element PE and the nozzle "n". The piezoelectric element PE is disposed at a position that comes into contact with an ink conduit 80 for leading ink to the nozzle "n". As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 80 as shown in the lower part of FIG. 4. The volume of the ink conduit 80 is reduced with an extension of the piezoelectric element PE, and a certain amount of ink corresponding to the reduced volume is sprayed as ink particles Ip from the ends of the nozzle "n" at a high speed. The ink particles Ip soak into the sheet of paper P set on the platen 26, so as to reproduce a print.

In the printer 22 of the embodiment having the hardware structure discussed above, the sheet feed motor 23 rotates the platen 26 and the other related rollers to feed the printing paper P. The carriage motor 24 drives and reciprocates the carriage 31, simultaneously with actuation of the piezoelectric elements PE on the respective ink discharge heads 61 through 64 of the print head 28. The printer 22 accordingly sprays the respective color inks and forms a multi-color image on the printing paper P. Concrete arrangements of the nozzles in the respective ink discharge heads 61 through 64 will be discussed later.

The mechanism for feeding the printing paper P includes a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for slidable supporting the carriage 31, a pulley 38, an endless drive belt 36 spanned between the carriage motor 24 and the pulley 38, and a position sensor 39 for detecting the position of the origin of the carriage 31.

The control circuit 40 includes a CPU (not shown), main memories having a ROM and a RAM (not shown), and a programmable ROM (PROM) 42, which is a rewritable non-volatile memory. The PROM 42 stores dot recording mode information including parameters with respect to a plurality of dot recording modes. The "dot recording mode" denotes the dot recording scheme defined by parameters such as the number of actually used nozzles N and the sub-scan feed amount L. In the specification hereof, the terms "recording scheme" and "recording mode" have substantially the same meanings. Concrete examples of the dot recording modes and their related parameters will be described later. Mode selection information is also stored in the PROM 42 to select a desired mode among the plurality of dot recording modes. For example, when the PROM 42 can store sixteen pieces of dot recording mode information, the mode selection information consists of four-bit data.

The dot recording mode information is read by the printer driver 96 from the PROM 42 when the printer driver 96 (FIG. 1) is installed at the startup of the computer 90. In more concrete terms, the printer driver 96 reads the dot recording mode information corresponding to a desired dot recording mode specified by the mode selection information from the PROM 42. The processes in the rasterizer 97 and the halftone module 99 as well as the main scans and sub-scans are carried out according to the dot recording mode information.

The PROM 42 may be any rewritable non-volatile memory and is, for example, an EEPROM or a flash memory. The dot recording mode information may be stored in a non-rewritable ROM, while it is preferable that the mode selection information is stored in the rewritable non-volatile memory.

Plural sets of dot recording mode information may be stored in a storage device other than the PROM 42 or alternatively in the printer driver 96.

FIG. 5 shows an arrangement of ink jet nozzles in the ink discharge heads 61 through 64. The first head 61 has a nozzle array for jetting black ink. Similarly the second through the fourth heads 62 through 64 respectively have nozzle arrays for jetting cyan, magenta, and yellow inks. These four nozzle arrays have identical positions in the sub-scanning direction.

Each of the four nozzle arrays includes thirty-two nozzles arranged in zigzag manner with a constant nozzle pitch k in the sub-scanning direction. The thirty-two nozzle n included in each nozzle array may be arranged in alignment, instead of in the zigzag manner. The zigzag arrangement as shown in FIG. 5(A), however, has the advantage of being able to set a smaller nozzle pitch k in the manufacturing process.

FIG. 5(B) shows an arrangement of a plurality of dots formed by one nozzle array. In this embodiment, driving signals are supplied to the piezoelectric elements PE (FIG. 4) of the respective nozzles in order to cause a plurality of dots formed by one nozzle array to be arranged substantially in alignment in the sub-scanning direction, regardless of the arrangement of the ink nozzles; that is, whether the nozzles are arranged in zigzag or in alignment. By way of example, it is assumed that the nozzles are arranged in zigzag as shown in FIG. 5(A) and that the head 61 is scanned rightward in the drawing to form dots. In this case, a group of preceding nozzles 100, 102, . . . receive driving signals at an earlier timing by d/v [second] than a group of following nozzles 101, 103 . . . . Here, d [inch] denotes a pitch between the two nozzle groups in the head 61(See FIG. 5(A)), and v [inch/second] denotes the scanning speed of the head 61. A plurality of dots formed by one nozzle array are accordingly arranged in alignment in the sub-scanning direction. As described later, all of thirty-two nozzles provided in each of the heads 61 through 64 are not always used, but only part of the nozzles may be used according to the dot recording scheme.

The nozzle array in each ink jet head shown in FIG. 5(A) corresponds to the dot forming element array of the present invention. The feeding mechanism of the carriage 31 including the carriage motor 24 shown in FIG. 2 corresponds to the main scan driving unit, and the feeding mechanism of the paper including the sheet feed motor 23 corresponds to the sub-scan driving unit. Moreover, a circuit including the piezoelectric element PE of each nozzle corresponds to the head driving of the present invention. The control circuit 40 and the printer driver 96 (FIG. 1) correspond to the control unit of the present invention.

B. Basic Conditions of Middle Area Recording Scheme

Before describing the dot recording schemes used in the embodiment of the present invention, the following describes basic conditions required for general recording schemes.

FIGS. 6(A) and 6(B) show basic conditions of a general dot recording scheme when the number of scan repeats s is equal to one. FIG. 6(A) illustrates an example of sub-scan feeds with four nozzles, and FIG. 6(B) shows parameters of the dot recording scheme. In the drawing of FIG. 6(A), solid circles including numerals indicate the positions of the four nozzles in the sub-scanning direction after each sub-scan feed. The encircled numerals 0 through 3 denote the nozzle numbers. The four nozzles are shifted in the sub-scanning direction every time when one main scan is concluded. Actually, however, the sub-scan feed is executed by feeding a printing paper with the sheet feed motor 23 (FIG. 2).

As shown on the left-hand side of FIG. 6(A), the sub-scan feed amount L is fixed to four dots. On every sub-scan feed, the four nozzles are shifted by four dots in the sub-scanning direction. When the number of scan repeats s is equal to one, each nozzle can record all dots (pixels) on the raster line. The right-hand side of FIG. 6(A) shows the nozzle numbers of the nozzles which record dots on the respective raster lines. There are non-serviceable raster lines above or below those raster lines that are drawn by the broken lines, which extend rightward (in the main scanning direction) from a circle representing the position of the nozzle in the sub-scanning direction. Recording of dots is thus prohibited on these raster lines drawn by the broken lines. On the contrary, both the raster lines above and below a raster line that is drawn by the solid line extending in the main scanning direction are recordable with dots. The range in which all dots can be recorded is hereinafter referred to as the "effective record area" (or the "effective print area"). The range in which the nozzles scan but all the dots cannot be recorded are referred to as the "non-effective record area (or the "non-effective print area)". All the area which is scanned with the nozzles (including both the effective record area and the non-effective record area) is referred to as the nozzle scan area.

Various parameters related to the dot recording scheme are shown in FIG. 6(B). The parameters of the dot recording scheme include the nozzle pitch k [dots], the number of used nozzles N, the number of scan repeats s, number of effective nozzles Neff, and the sub-scan feed amount L [dots].

In the example of FIGS. 6(A) and 6(B), the nozzle pitch k is 3 dots, and the number of used nozzles N is 4. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster line. In the case of FIGS. 6(A) and 6(B), the number of scan repeats s is 1. The number of effective nozzles Neff is obtained by dividing the number of used nozzles N by the number of scan repeats s. The number of effective nozzles Neff may be regarded as the net number of raster lines that can be fully recorded during a single main scan. The meaning of the number of effective nozzles Neff will be further discussed later.

The table of FIG. 6(B) shows the sub-scan feed amount L, its accumulated value ΣL, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 6(A)). For example, as shown in FIG. 6(A), a first sub-scan feed moves the nozzles in the sub-scanning direction by the sub-scan feed amount L (4 dots). The nozzle pitch k is 3 dots as mentioned above. The offset F of the nozzles after the first sub-scan feed is accordingly 1 (see FIG. 6(A)). Similarly, the position of the nozzles after the second sub-scan feed is ΣL(=8) dots away from the initial position so that the offset F is 2. The position of the nozzles after the third sub-scan feed is ΣL(=12) dots away from the initial position so that the offset F is 0. Since the third sub-scan feed brings the nozzle offset F back to zero, all dots of the raster lines within the effective record area can be serviced by repeating the cycle of 3 sub-scans.

As will be understood from the above example, when the nozzle position is apart from the initial position by an integral multiple of the nozzle pitch k, the offset F is zero. The offset F is given by (ΣL)% k, where ΣL is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the effective record area:

Condition c1: The number of sub-scan feeds in one feed cycle is equal to the nozzle pitch k.

Condition c2: The nozzle offsets F after the respective sub-scan feeds in one feed cycle assume different values in the range of 0 to (k−1).

Condition c3: Average sub-scan feed amount (ΣL/k) is equal to the number of used nozzles N. In other words, the accumulated value ΣL of the sub-scan feed amount L for the whole feed cycle is equal to a product (N×k) of the number of used nozzles N and the nozzle pitch k.

The above conditions can be understood as follows. Since (k−1) raster lines are present between adjoining nozzles, the number of sub-scan feeds required in one feed cycle is equal to k so that the (k−1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition c1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k−1). The second condition c2 is accordingly required.

When the first and the second conditions c1 and c2 are satisfied, each of the N nozzles records k raster lines in one feed cycle. Namely N×k raster lines can be recorded in one feed cycle. When the third condition c3 is satisfied, the nozzle position after one feed cycle (that is, after the k sub-scan feeds) is away from the initial position by the N×k raster lines as shown in FIG. 6(A). Satisfying the above first through the third conditions c1 to c3 thus prevents skipping or overwriting of raster lines to be recorded in the range of N×k raster lines.

FIGS. 7(A) and 7(B) show the basic conditions of a general dot recording scheme when the number of scan repeats s is no less than 2. When the number of scan repeats s is 2 or greater, each raster line is recorded with s different nozzles. In the description hereinafter, the dot recording scheme adopted when the number of scan repeats s is not less than 2 is referred to as the "overlap scheme".

The dot recording scheme shown in FIGS. 7(A) and 7(B) amounts to that obtained by changing the number of scan repeats s and the sub-scan feed amount L among the dot recording scheme parameters shown in FIG. 6(B). As will be understood from FIG. 7(A), the sub-scan feed amount L in the dot recording scheme of FIGS. 7(A) and 7(B) is a constant value of two dots. In FIG. 7(A), the nozzle positions after the odd-numbered sub-scan feeds are indicated by the diamonds. As shown on the right-hand side of FIG. 7(A), the dot positions recorded after the odd-numbered sub-scan feed are shifted by one dot in the main scanning direction from the dot positions recorded after the even numbered sub-scan feed. This means that the plurality of dots on each raster line are recorded intermittently by each of two different nozzles. For example, the upper-most raster in the effective record area is intermittently recorded on every other dot by the No. 2 nozzle after the first sub-scan feed and then intermittently recorded on every other dot by the No. 0 nozzle after the fourth sub-scan feed. In the overlap scheme, each nozzle is generally driven at an intermittent timing so that recording is prohibited for (s−1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 7(A). In one possible scheme, dot recording is executed at the positions indicated by the circles shown in the right-hand side of FIG. 7(A) after the first sub-scan feed, and is executed at the shifted positions indicated by the diamonds after the fourth sub-scan feed.

The lower-most row of the table of FIG. 7(B) shows the values of the offset F after each sub-scan feed in one feed cycle. One feed cycle includes six sub-scan feeds. The offsets F after each of the six sub-scan feeds assume every value between 0 and 2, twice. The variation in the offset F after the first through the third sub-scan feeds is identical with that after the fourth through the sixth sub-scan feeds. As shown on the left-hand side of FIG. 7(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is an integer of not less than 2, the first through the third conditions c1 to c3 discussed above are rewritten into the following conditions c1' through c3':

Condition c1': The number of sub-scan feeds in one feed cycle is equal to a product (k×s) of the nozzle pitch k and the number of scan repeats s.

Condition c2': The nozzle offsets F after the respective sub-scan feeds in one feed cycle assume every value between 0 to (k−1), s times.

Condition c3': Average sub-scan feed amount {ΣL/(k×s)} is equal to the number of effective nozzles Neff (=N/s). In other words, the accumulated value ΣL of the sub-scan feed amount L for the whole feed cycle is equal to a product {Neff×(k×s)} of the number of effective nozzles Neff and the number of sub-scan feeds (k×s).

The above conditions c1' through c3' hold even when the number of scan repeats s is one. This means that the conditions c1' through c3' generally hold for the dot recording scheme irrespective of the number of scan repeats s. When these three conditions c1' through c3' are satisfied, there is no skipping or overwriting of dots recorded in the effective record area. If the overlap scheme is applied (if the number of scan repeats s is not less than 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions c1' through c3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neff). The number of effective nozzles Neff in this embodiment corresponds to the number of effective dot forming elements in the present invention.

C. Embodiments of Dot Recording Schemes

Figure 8:
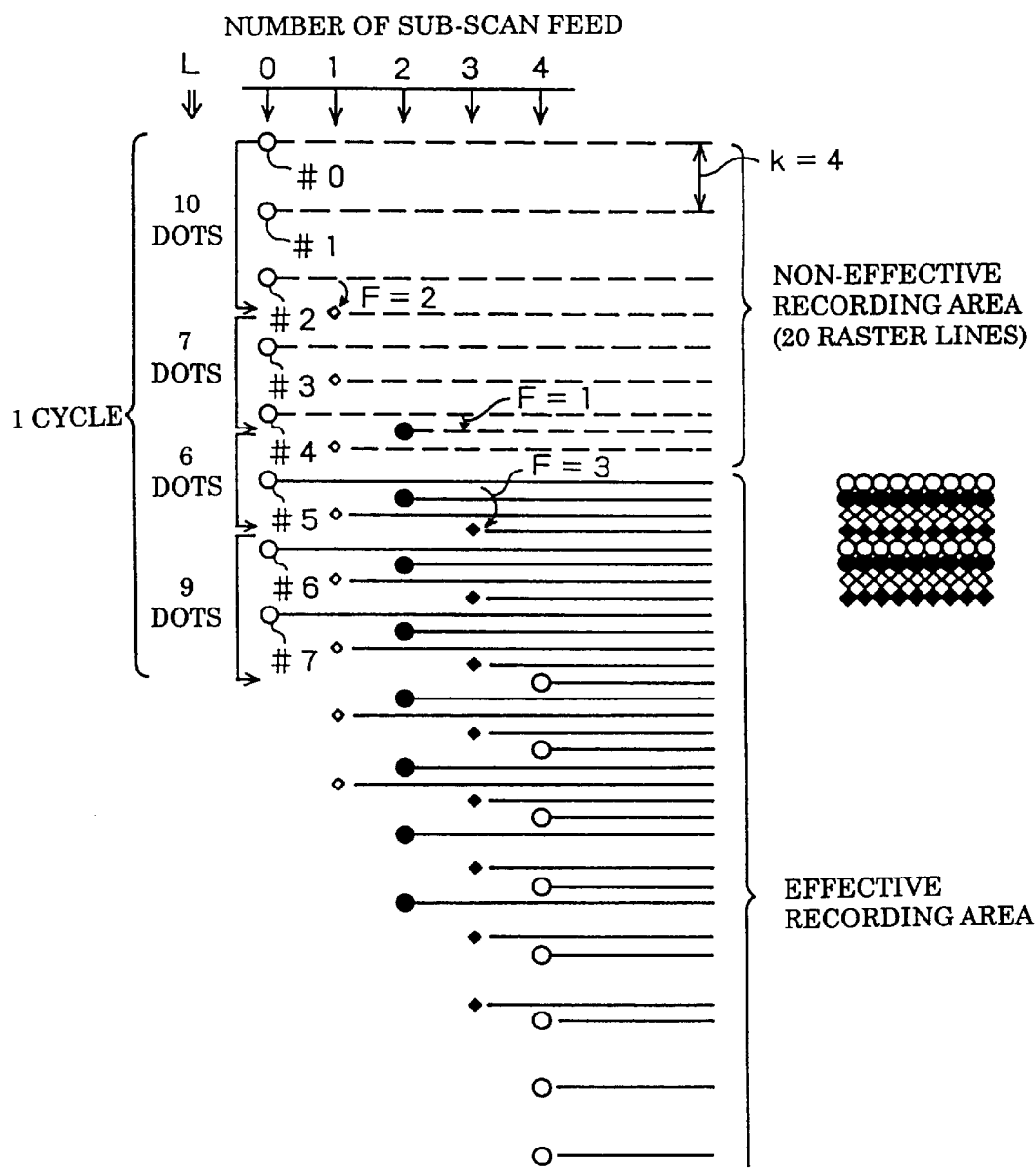
FIG. 8 shows a first dot recording scheme in the embodiment of the present invention.
Figure 22:
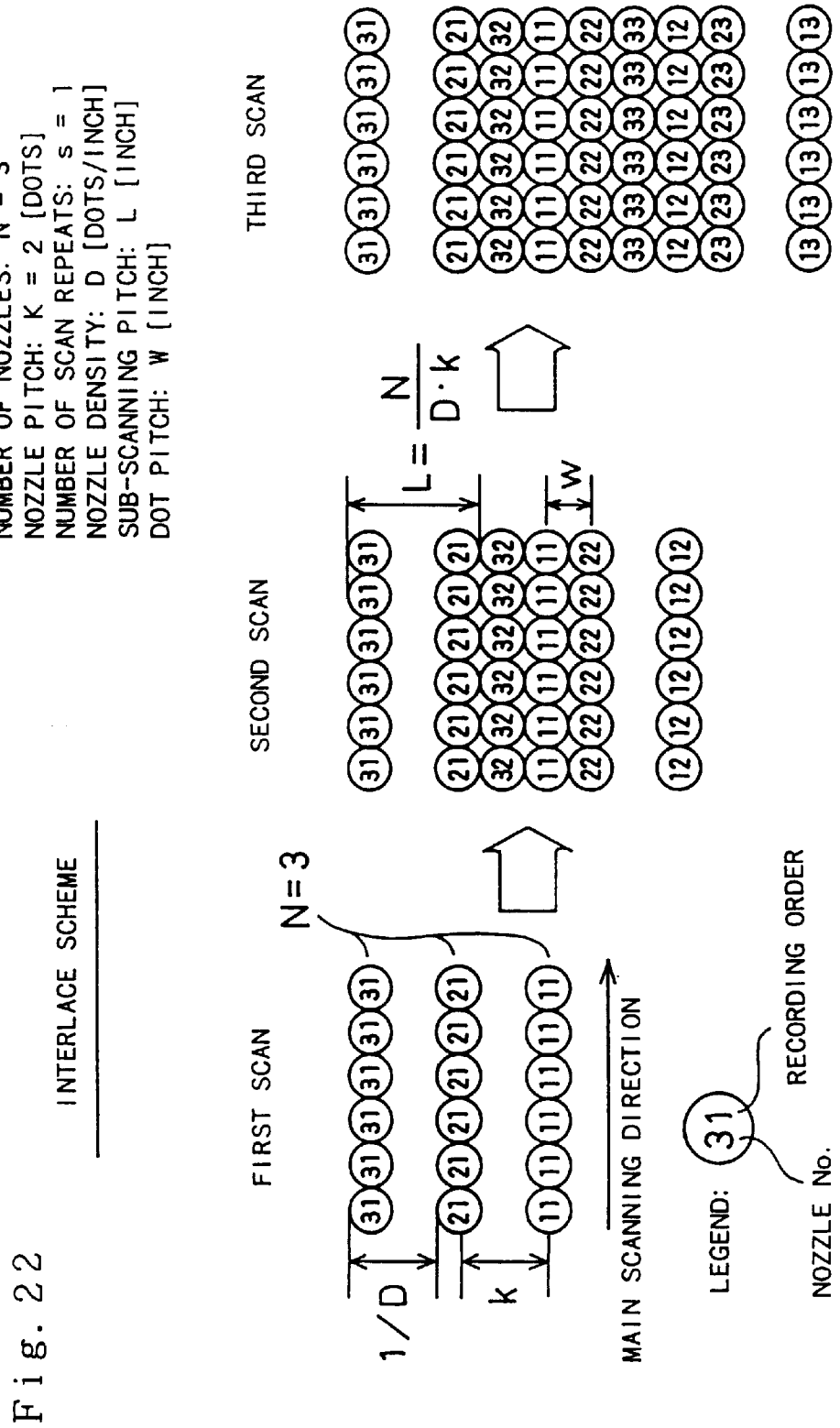
FIG. 22 shows an example of the conventional interlace recording scheme.
Figure 23:
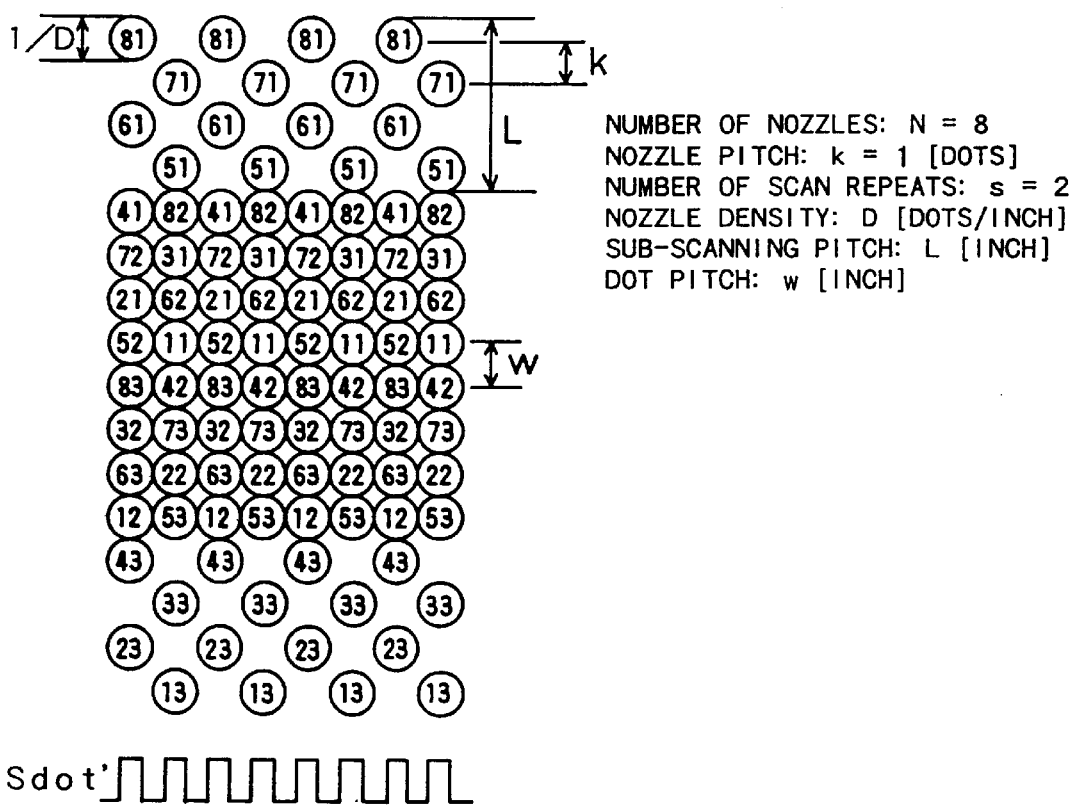
FIG. 23 shows an example of the conventional overlap recording scheme.

FIG. 8 shows a first dot recording scheme in the embodiment of the present invention. The scan parameters of this dot recording scheme are shown in the bottom of FIG. 8, where the nozzle pitch k is equal to 4 dots, the number of used nozzles N is equal to 8, the number of scan repeats s is equal to 1, and the number of effective nozzles Neff is equal to 8.

In the example of FIG. 8, nozzle numbers #0 through #7 are allocated to the eight used nozzles from the top. In the first dot recording scheme, four sub-scan feeds constitute one cycle, and the amount of the sub-scan feed L is varied in the sequence of 10, 7, 6, and 9 dots. This means that a plurality of different values are used for the sub-scan feed amount L. The positions of the eight nozzles in the respective sub-scan feeds are shown by four different figures. The right end of FIG. 8 shows by which nozzle and after which sub-scan feed the dots on the raster lines in the effective record area are to be recorded. In the first dot recording scheme, a non-effective record area of 20 raster lines is present before the effective record area. Namely the effective record area starts at the 21st raster line from the upper end of the nozzle scan area (the range including the effective record area and the non-effective record area). The nozzle position in the first main scan is set to be apart from the upper end of the printing paper by a predetermined distance. The earlier starting position of the effective record area enables the dots to be recorded from the position closer to the upper end of the printing paper.

FIGS. 9(A) and 9(B) show the scan parameters and the raster numbers of the effective raster lines recorded by the respective nozzles in the first dot recording scheme. The table of FIG. 9(A) shows the sub-scan feed amount L and its summation ΣL for each sub-scan feed, the offset F of the nozzle after each sub-scan feed, and the offset G of the sub-scan feed amount L. The offset G of the sub-scan feed amount L is the remainder obtained by dividing the sub-scan feed amount L by the nozzle pitch k. The meaning of the offset G of the sub-scan feed amount L will be described later in detail.

The parameters shown in FIG. 9(A) satisfy the three conditions c1' through c3' discussed above. The number of sub-scan feeds in one cycle is equal to the product (k×s=4) of the nozzle pitch k(=4) and the number of scan repeats s(=1) (first condition c1'). The offset F of the nozzle after each sub-scan feed in one cycle assumes the values in the range of 0 to (k−1) (i.e., in the range of 0 to 3) (second condition c2'). The average sub-scan feed amount (ΣL/k) is equal to the number of effective nozzles Neff(=8) (third condition c3'). The first dot recording scheme accordingly satisfies the fundamental requirement that there is no dropout or overlap of recorded raster lines in the effective recording area.

The first dot recording scheme also has the following two features. The first feature is that the nozzle pitch k and the number of used nozzles N are integers which are no less than 2 and which are not relatively prime. The second feature is that a plurality of different values are used for the sub-scan feed amount L. As discussed previously in the prior art, the conventional dot recording scheme sets the number of nozzles N and the nozzle pitch k at the integers that are relatively prime. The number of nozzles N actually used among a large number of nozzles provided is thus restricted to the value that is prime to the nozzle pitch k. In other words, the problem of the conventional process is that the nozzles provided are not sufficiently used in many cases. Application of the dot recording scheme having the first feature that the nozzle pitch k and the number of used nozzles N are integers which are no less than 2 and which are not relatively prime, on the other hand, advantageously increases the number of used nozzles as many as possible. The second feature allows the fundamental requirement that there is no dropout or overlap of recorded raster lines in the effective record area to be satisfied when the dot recording scheme has the first feature. There will be dropout or overlap of raster lines if the dot recording scheme that has the first feature and a fixed sub-scan feed amount L is applied.

FIG. 9(B) shows the raster numbers of the effective raster lines recorded by the respective nozzles in the main scan after each sub-scan feed. The left-hand side of FIG. 9(B) shows the nozzle numbers #0 through #7. The values on the right-hand side of the nozzle numbers represent which raster lines in the effective record area are recorded by the respective nozzles after the 0th to 7th sub-scan feeds. By way of example, in the main scan after the 0th sub-scan feed (that is, in the first main scan for recording the effective record area), the nozzles #5 through #7 record the 1st, 5th, and 9th effective raster lines. In the main scan after the 1st sub-scan feed, the nozzles #3 through #7 record the 3rd, 7th, 11th, 15th, and 19th effective raster lines. The term "effective raster lines" here denotes the raster lines in the effective record area.

It can be understood that, in FIG. 9(B), a difference between raster numbers of the effective raster lines recorded during one main scan is equal to the nozzle pitch k(=4). One scan cycle accordingly records N×k (that is, 32) raster lines. Since any successive nozzles are apart from each other by the nozzle pitch k, one cycle does not record 32 sequential raster lines as clearly understood from FIG. 8. FIG. 9(B) shows which nozzles are used to record the first 32 raster lines in the effective record area.

In FIG. 9(B), the effective raster numbers written in the brackets show that the raster lines at the positions having the equivalent scanning conditions have been recorded in the previous cycle. Namely the difference obtained by subtracting 32 from the numeral in the brackets indicates the equivalent raster line number. For example, the raster line of the effective raster number 36 recorded by the nozzle #0 is present at the position having the equivalent scanning conditions to those of the raster line of the effective raster number 4.

FIG. 10 shows the nozzle numbers for recording the effective raster lines in the first dot recording scheme. The numerals 1 through 31 on the left-end column of FIG. 10 show the effective raster numbers. The right-hand side of FIG. 10 shows the positions of the effective raster lines recorded by the eight nozzles #0 through #7 in the main scans after the respective sub-scan feeds. For example, in the main scan after the 0th sub-scan feed, the nozzles #5 through #7 record the 1st, 5th, and 9th effective raster lines, respectively. Comparison between FIG. 10 and FIG. 9(B) clearly shows the relationship between the effective raster lines and the nozzle numbers.

Four different symbols "·", "x", "=", and "↓" in the second-left column of FIG. 10 show whether or not the adjoining raster lines have already been recorded before the recording of each raster line. The respective symbols have the following meaning:

↓: Only one raster line immediately below itself has already been recorded.

↑: Only one raster line immediately above itself has already been recorded.

x: Both raster lines above and below itself have already been recorded.

·: Neither of the raster lines above and below itself have been recorded.

The recording state of the adjoining raster lines above and below each raster line affects the image quality of the raster line being recorded. The effects on the image quality are ascribed to the dryness of ink on the adjoining raster lines that have already been recorded and to sub-scan feed errors. If the pattern by the four different symbols appears at a relatively large interval, it may deteriorate the image quality of the whole image. In the first dot recording scheme shown in FIG. 10, however, the pattern by the four different symbols does not show any clear periodicity. It is accordingly expected that the first recording scheme causes less deterioration of the image quality due to this reason but enables an image of relatively high image quality to be recorded.

The third-left column of FIG. 10 shows the value $\Delta$ representing how many sub-scan feeds have been executed at the maximum between recording of each raster line and recording of the adjoining raster line. The value $\Delta$ is hereinafter referred to as the "sub-scan feed number difference". By way of example, the second effective raster line is recorded by the nozzle #1 after the 2nd sub-scan feed, whereas the first raster line is recorded by the nozzle #5 after the 0th sub-scan feed and the third raster line is recorded by the nozzle #3 after the 1st sub-scan feed. The sub-scan feed number difference $\Delta$ is accordingly equal to 2 with respect to the second raster line. In a similar manner, the fourth raster line is recorded after three sub-scan feeds have been executed since recording of the fifth raster line. The sub-scan feed number difference $\Delta$ is thus equal to 3 with respect to the fourth raster line.

Since one cycle consists of k(=4) sub-scan feeds, the sub-scan feed number difference $\Delta$ may be the value in the range of 0 to k. In the first dot recording scheme for k=4, it is understood that the maximum sub-scan feed number difference $\Delta$ is equal to 3, which is smaller than the possible upper limit value k(=4).

It is ideal that the sub-scan feed is carried out strictly by the amount equal to an integral multiple of the dot pitch. In the actual state, however, the sub-scan feed has some feeding error. The sub-scan feed error is accumulated at every time of sub-scan feed. When a large number of sub-scan feeds are interposed between recording of adjoining two raster lines, the accumulated sub-scan feed error may cause a positional misalignment of the adjoining two raster lines. As mentioned above, the sub-scan feed number difference $\Delta$ shown in FIG. 10 denotes the number of sub-scan feeds carried out between recording of the adjoining raster lines. The smaller sub-scan feed number difference Δ is preferable, in order to minimize the positional misalignment of the adjoining raster lines due to the accumulated sub-scan feed error. In the first dot recording scheme for k=4 shown in FIG. 10, the sub-scan feed number difference Δ is not greater than 3 and is smaller than the upper limit value 4. This allows a favorable image to be recorded from this viewpoint.

FIGS. 11(A) and 11(B) show the scan parameters and the raster numbers of the effective raster lines recorded by the respective nozzles in a second dot recording scheme in the embodiment of the present invention. FIGS. 11(A) and 11(B) correspond to FIGS. 9(A) and 9(B) in the first dot recording scheme discussed above. The difference between the first and second dot recording scheme is only the sequence of the sub-scan feed amounts L. In the first dot recording scheme, the sub-scan feed amount L varies in the sequence of 10, 7, 6, and 9 dots. In the second dot recording scheme, on the other hand, the sub-scan feed amount varies in the sequence of 7, 6, 9, and 10 dots.

Like the first dot recording scheme, the second dot recording scheme has the first feature that the nozzle pitch k and the number of used nozzles N are integers which are no less than 2 and which are not relatively prime, and the second feature that a plurality of different values are used for the sub-scan feed amount L.

FIG. 12 shows the nozzle numbers for recording the effective raster lines in the second dot recording scheme. FIG. 12 corresponds to FIG. 10 in the first dot recording scheme. Like the first dot recording scheme shown in FIG. 10, in the second dot recording scheme, the pattern of the symbols @ representing the recording state of the adjoining raster lines above and below each raster line does not have any clear periodicity. It is accordingly expected that the second dot recording scheme also gives an image of relatively good quality. Since the sub-scan feed number difference Δ is not greater than 3, this process enables a favorable image to be recorded from the viewpoint of minimizing the accumulated sub-scan feed error.

Although not being specifically illustrated, the effective record area in the second dot recording scheme starts at the 20th raster line from the upper end of the nozzle scanning range (the range including the effective record area and the non-effective record area). In the first dot recording scheme shown in FIG. 8, on the other hand, the effective record area starts at the 21st raster line from the upper end of the nozzle scanning range. This means that the starting position of the effective record area in the second dot recording scheme is closer by one raster line to the upper end of the printing paper, compared with the first dot recording scheme. Such difference in starting position of the effective record area is ascribed to the difference in the sequence of the sub-scan feed amounts L between the first dot recording scheme and the second dot recording scheme. The identical combination of four values is used for the sub-scan feed amount L in both the first and second dot recording schemes, but the sequence of the values is different. Whereas the sub-scan feed amount L varies in the sequence of 10, 7, 6, and 9 in the first dot recording scheme, the sub-scan feed amount L varies in the sequence of 7, 6, 9, and 10 in the second dot recording scheme. The starting position of the effective record area is closer to the upper end of the printing paper in the second dot recording scheme. This may be attributable to the fact that the first sub-scan feed amount L(=7) in the second dot recording scheme is smaller than that of the first sub-scan feed amount L(=10) in the first dot recording scheme.

This can be understood from the following example. Consider here a dot recording scheme in which the nozzle pitch k is equal to 12 dots and one cycle includes twelve scans. Plural combinations including seven feeds of 17 dots and five feeds of 5 dots are available for the sub-scan feed amount L in this dot recording scheme. Among all the alternative dot recording schemes, the dot recording scheme that initially carries out five sub-scan feeds of 5 dots and subsequently seven sub-scan feeds of 17 dots will have the effective record area which starts at the 117th raster line from the upper end of the nozzle scanning range (the range including the non-effective record area and the effective record area). The dot recording scheme that initially carries out seven sub-scan feeds of 17 dots and subsequently five sub-scan feeds of 5 dots will have, on the other hand, the effective record area which starts at the 129th raster line from the upper end of the nozzle scanning range. Compared with the dot recording scheme that repeats the sub-scan feeds of 5 dots first, the dot recording scheme that repeats the sub-scan feeds of 5 dots first enables recording of the effective dots to start from the position closer to the upper end of the printing paper by 12 raster lines.

As clearly understood from this example, in general, the smaller amounts for initial several sub-scan feeds among the plurality of sub-scan feeds included in one cycle tends to start the recording from the position closer to the upper end of the printing paper. From this viewpoint, it is preferable to select the dot recording scheme which has smaller amounts L for a predetermined number of (for example, a couple of) initial sub-scan feeds, among the plurality of alternative dot recording schemes. In other words, it is preferable to select the sequence having smaller amounts L for a predetermined number of initial sub-scan feeds, among the plurality of choices having an identical combination of plural different values but a different sequence of the values. As shown by the comparison between the first and second recording schemes, there is a better possibility that smaller amounts of the first sub-scan feed L enables the recording to start from the position closer to the upper end of the printing paper. It is thus especially preferable to select the dot recording scheme which has a smaller first sub-scan feed amount L.

The starting position of the effective record area by each dot recording scheme can be known in advance from the scan parameters. It is accordingly possible to select the dot recording scheme which has the earliest starting position of the effective record area (that is, closest to the upper end of the printing paper) among the plurality of alternative dot recording schemes. In a similar manner, it is possible to select the dot recording scheme having the latest end position of the effective record area (that is, closest to the lower end of the printing paper) among the plurality of alternative dot recording schemes.

FIG. 13 shows the scan parameters and the raster numbers of the effective raster lines recorded by the respective nozzles in a third dot recording scheme. In the third dot recording scheme, the nozzle pitch k is equal to 8 dots and the number of used nozzles N is equal to 16. The number of scan repeats is equal to 1. Like the first dot recording scheme, the third dot recording scheme has the first feature that the nozzle pitch k and the number of used nozzles N are integers which are no less than 2 and which are not relatively prime, and the second feature that a plurality of different values are used for the sub-scan feed amount L.

FIG. 14 shows the nozzle numbers for recording the effective raster lines in the third dot recording scheme. In the third dot recording scheme, the pattern of the symbols @ representing the recording state of the adjoining raster lines above and below each raster line does not have a significantly large period. It is accordingly expected to attain the relatively high image quality. The difference in number of sub-scan feeds Δ is equal to either 3 or 5, which is significantly smaller than the possible upper limit 8. This arrangement reduces the accumulated error of sub-scan feed and thereby enables a favorable image to be recorded.

In addition to the two features discussed above, the third dot recording scheme has another feature with respect to the sub-scan feed amount L. In the third dot recording scheme, the sub-scan feed amount L assumes values of 13 and 21 and the offset G (=L% k) of the sub-scan feed amount L is a constant value as shown in the table of FIG. 13(A). The offset G denotes a deviation of the periodical positions (that is, the phase deviation) of the plurality of nozzles after a sub-scan feed from the periodical positions of these nozzles before the sub-scan feed. For example, when the offset G is equal to zero (that is, when the sub-scan feed amount L is an integral multiple of the nozzle pitch k), the periodical positions of the nozzles after the sub-scan feed overlaps the periodical position of the nozzles before the sub-scan feed. In order to avoid such an overlap, the offset G is generally not equal to zero. According to the periodicity of the arrangement of the nozzles, the fixed offset G with respect to the sub-scan feed amount L causes the nozzles to be fed by a fixed amount of shift in the sub-scanning direction. By way of example, when the offset G is equal to 1, the nozzles will be arranged at the positions whose phase is shifted downward by one raster line from the nozzle positions before the sub-scan feed.

The offset G of the sub-scan feed amount L will not be equal to zero in any case. As clearly understood from the definition of the offset G, the value of the offset G is smaller than the nozzle pitch k. Especially when the offset G is constant, the offset G is set at an integer that is relatively prime to the nozzle pitch k. Such setting enables the condition c2' discussed above, that is, 'The offset F of the nozzles after each sub-scan feed included in one cycle takes a value in the range of 0 to (k−1) and the value is repeated s times.', to be satisfied. A desirable value for the constant offset G of the sub-scan feed amount L is determined by considering the following factors.

FIG. 15 shows an example of the dot recording scheme when the offset G is fixed to one. In this example, the raster line 9 is recorded after a first sub-scan feed in the effective recording area. The raster line 8 is recorded after seven sub-scan feeds since then. The errors of k times of sub-scan feeds re accordingly accumulated between these two raster lines. The raster lines 18 and 17 hold a similar relation. With a view to preventing the error of sub-scan feed from being accumulated, it is desirable to set the sub-scan feed amount L in such a manner that the offset G of the sub-scan feed amount L has a value other than 1. Like the case of G=1, in the case of the offset G equal to (k−1), the error of k sub-scan feeds is accumulated. It is accordingly desirable to set the offset G equal to a value other than (k−1).

In the example of FIG. 15, the pattern of the symbols @ representing the recording state of the adjoining raster lines above and below each raster line shows a significantly large cycle. It is accordingly possible that a pattern of the large cycle is observed in a recorded image. In order to prevent the periodic pattern from appearing, it is preferable that the constant offset G is set at a value other than 1 and (k−1) to.

When taking into account of the above factors, the constant offset G is preferably set at a value which is prime to the nozzle pitch k and in the range of 2 to (k−2) when the offset G of the sub-scan feed amount L is fixed to a constant value. FIG. 16 shows preferable combinations of the nozzle pitch k and the offset G of the sub-scan feed amount. The values shown in FIG. 16 all satisfy the conditions of the desirable offset G.

When the offset G is equal to either 1 or (k−1), adjoining raster lines are recorded in a successive manner. In this case, before the ink is dried on a raster line just recorded, the recording on an adjoining raster line starts, thereby causing a blur of ink. The similar phenomenon occurs not only when the offset G has a constant value but the offset G is varied for each sub-scan feed amount L. In order to prevent the blur of ink, whether or not the offset G of the sub-scan feed amount L is constant, it is preferable to set the sub-scan feed amount L so that the offset G takes a value other than 1 and (k−1).

In the third dot recording scheme, the plurality of values (13 and 21) are used for the sub-scan feed amount L, and the offset G of the sub-scan feed amount L is a preferable constant value. This arrangement effectively prevents the accumulation of the sub-scan feed errors, thereby enabling an image of high image quality to be recorded.

FIGS. 17(A) and 17(B) show the scan parameters and the raster numbers of the effective raster lines recorded by the respective nozzles in a fourth dot recording scheme. The difference between the fourth dot recording scheme and the third dot recording scheme shown in FIGS. 13(A) and 13(B) is only the sub-scan feed amount L. Like the third dot recording scheme, the fourth dot recording scheme has the first feature that the nozzle pitch k and the number of used nozzles N are integers which are no less than 2 and which are not relatively prime, and the second feature that a plurality of different values are used for the sub-scan feed amount L. The fourth dot recording scheme also has the third feature that the offset G (=L% k) of the sub-scan feed amount L is a constant value. As shown in FIG. 16 discussed above, the value (=5) of the offset G of the sub-scan feed amount L in the fourth dot recording scheme is an especially preferable one.

FIG. 18 shows the nozzle numbers for recording the effective raster lines in the fourth dot recording scheme. Like the third dot recording scheme shown in FIG. 14, in the fourth dot recording scheme, the pattern of the symbols @ representing the recording state of the adjoining raster lines above and below each raster line does not have a significantly large cycle. It is accordingly expected to attain a relatively favorable image quality. Since the difference in number of sub-scan feeds Δ is equal to either 3 or 5, which is significantly smaller than the possible upper limit 8, a favorable image can be recorded from the viewpoint of smaller accumulated error of the sub-scan feed.

Having the variety of features that are substantially similar to those of the third dot recording scheme, the fourth dot recording scheme can record a high quality image in the same manner as the third dot recording scheme.

FIG. 19 shows the scan parameters in a fifth dot recording scheme. In the fifth dot recording scheme, the nozzle pitch k is equal to 8 dots and the number of used nozzles N is equal to 32. The number of scan repeats s is equal to 2 and the number of effective nozzles Neff is equal to 16. As clearly understood from the comparison with the parameters in the fourth dot recording scheme shown in FIG. 17, the number of effective nozzles Neff in the fifth dot recording scheme is kept equal to that in the fourth dot recording scheme, whereas the number of scan repeats s is set equal to 2 and the number of used nozzles N is doubled in the fifth dot recording scheme. Since the nozzle pitch k and the number of effective nozzles Neff in the fifth dot recording scheme are equal to those in the fourth dot recording scheme, the same values as those of the fourth dot recording scheme are used for the sub-scan feed amount L. However, since the eight sub-scan feeds shown in the table of FIG. 19 records the raster lines only once, another eight sub-scan feeds are executed to record dots without any space. The eight sub-scan feeds shown in the table of FIG. 19 accordingly correspond to the sub-cycle in FIG. 6(A) discussed previously.

FIG. 20 shows the raster numbers of the effective raster lines recorded by the respective nozzles in the fifth dot recording scheme. The raster numbers of FIG. 20 are similar to those of the fourth dot recording scheme shown in FIGS. 17(A) and 17(B). The raster line with a negative number represents that dots are recorded at the positions which are shifted by one dot in the main scanning direction on the raster line. FIG. 21 shows the nozzle numbers for recording the effective raster lines in the fifth dot recording scheme. In FIG. 21, the nozzle with a negative number represents that the nozzle records dots at the positions which are shifted by one dot in the main scanning direction. As clearly understood from the drawing, two nozzles of different numbers are positioned on the same raster line, and the respective nozzles record dots at the positions which are shifted by one dot in the main scanning direction on the raster line. This enables all the dots in the effective recording area to be recorded. In general, s pieces of different nozzles (s denotes the number of scan repeats) are positioned on the same raster line, and the s pieces of nozzles respectively record dots at the positions which are shifted from one another in the main scanning direction on the raster line.

Having similar features to those of the fourth dot recording scheme except for the number of scan repeats s, the fifth dot recording scheme can record a high quality image in the same manner as the fourth dot recording scheme.

The present invention is not restricted to the above embodiments or their applications, but there may be many modifications, changes, and alterations without departing from the scope or spirit of the main characteristics of the present invention. Some examples of possible modification are given below.

Although the above embodiments are concerned with dot recording schemes for one color, application of the dot recording scheme to each color will implement color printing with plural colors of inks.

The principle of the present invention is applicable not only to the color printing but to the monochrome printing. The present invention is also applicable to the printing that expresses each pixel with a plurality of dots to attain multi-tones. The present invention is further applicable to drum scan printers. In the drum scan printer, the rotating direction of the drum corresponds to the main scanning direction, and the feeding direction of the carriage corresponds to the sub-scanning direction. The present invention is applicable not only to the ink jet printers but in general to any dot recording apparatuses that record dots on the surface of a printing medium with a recording head having plural arrays of dot-forming elements. The "dot-forming elements" here denote elements for forming the dots, such as the ink nozzles in the ink jet printer.

The structure embodied by hardware circuitry in the above embodiments can be replaced by software, and on the contrary, the structure embodied by software can be replaced by hardware circuitry. For example, the function of the control circuit 40 of the color printer 22 (FIG. 2) may be implemented by the computer. In this case, a computer program such as the printer driver 96 executed the same control function as that of the control circuit 40.

The computer programs for implementing those functions are provided as stored on a computer readable medium, such as floppy disks or CD-ROMs. The computer 90 reads the computer programs from the storage medium and transfer them to the internal storage device or to the external storage device. Alternatively the computer programs may be supplied from a program supply apparatus to the computer 90 via a communications path. At the time of executing the functions of the computer programs, the programs stored in the main memory are executed by the microprocessor of the computer 90. Alternatively, the computer 90 may read out computer programs stored on the storage medium to directly execute it.

In the specification hereof, the term computer 90 implies both the hardware and its operating system and more specifically represents the hardware operating under the control of the operating system. The computer programs cause the computer 90 to implement the above functions. Part of these functions may be implemented by the operating system instead of the applications programs.

The "computer readable medium" in the present invention is not restricted to the portable storage medium, but includes a variety of internal storage devices in the computer, for example, RAMs and ROMs, and external storage devices connected with the computer, for example, hard disks.

The present invention may be applicable to ink-jet type monochrome printers and color printers, and to any recording apparatuses that use a recording head having plural arrays of dot-forming elements.

What is claimed is:

1. A dot recording apparatus for recording dots on a surface of a printing medium with a dot recording head, the dot recording apparatus comprising:

a dot-forming element array arranged on the dot recording head to face the printing medium, the dot-forming element array comprising a plurality of dot-forming elements for forming a plurality of dots of an identical color at a substantially constant pitch in a sub-scanning direction;

a main scan driving unit that drives at least one of the dot recording head and the printing medium to carry out main scan;

a head driving unit that drives at least part of the plurality of dot-forming elements to form dots during the main scan;

a sub-scan driving unit that drives at least one of the dot recording head and the printing medium every time when the main scan is completed, thereby carrying out sub-scan; and a control unit that controls the above units;

wherein the control unit controls the head driving unit such that the dot recording head is driven according to a condition that a number of effective dot-forming elements and an element pitch k are set at integers which are no less than 2 and which are not relatively prime, the number of effective dot-forming elements representing a net number of raster lines in a main scanning direction which can be recorded by one main scan, the element pitch k representing a pitch of the plurality of dot-forming elements expressed in unit of a number of dots; and wherein the control unit controls the sub-scan driving unit such that dot positions on each raster line are classified into one or more groups for recording and that each group of the dot positions are recorded using a sequence of a plurality of different values for sub-scan feed amounts, thereby enabling all raster lines included in an effective recording area of the printing medium to be recorded.

2. A dot recording apparatus in accordance with claim 1, wherein the plurality of different values used for the sub-scan feed amounts are selected in such a manner that remainders obtained by dividing the respective values by the element pitch k are fixed to a constant value.

3. A dot recording apparatus in accordance with claim 1, wherein the plurality of different values used for the sub-scan feed amounts are selected in such a manner that the remainders obtained by dividing the respective values by the element pitch k are in a range of 2 to (k−2).

4. A dot recording apparatus in accordance with claim 1, wherein, among a plurality of alternative sequences having an identical combination of the plurality of different values that are arranged in different orders, a sequence having smaller sub-scan feed amounts for a predetermined number of initial sub-scan feeds is selected to be used as a sequence of the different values for the sub-scan feed amounts.

5. A dot recording apparatus in accordance with claim 1, wherein the control unit controls the head driving unit such that, the head driving unit drives the dot forming element array during each main scan at intermittent timings to disable dot formation for (s−1) dot positions among s consecutive dots in the main scanning direction where s is a predetermined integer of at least two; and wherein the number of effective dot-forming elements is a value obtained by dividing, by the integer s, a number of dot-forming elements which are actually used for recording among the plurality of dot-forming elements.

6. A method of recording dots on a surface of a printing medium with a dot recording head, the dot recording head having a dot-forming element array including a plurality of dot-forming elements for forming a plurality of dots of an identical color arranged at a substantially constant pitch in a sub-scanning direction, the method comprising the steps of:

(a) driving at least one of the dot recording head and the printing medium to carry out main scan;

(b) driving at least part of the plurality of dot-forming elements to form dots during the main scan; and (c) driving at least one of the dot recording head and the printing medium every time when the main scan is concluded, thereby carrying out sub-scan;

wherein in the step (b) the dot recording head is driven according to a condition that a number of effective dot-forming elements and an element pitch k are set at integers which are no less than 2 and which are not relatively prime, the number of effective dot-forming elements representing a net number of raster lines in a main scanning direction which can be recorded by one main scan, the element pitch k representing a pitch of the plurality of dot-forming elements expressed in unit of a number of dots; and wherein in the step (c) the sub-scan is driven such that dot positions on each raster are classified into one of more groups for recording and that each group of the dot positions are recorded using a sequence of a plurality of different values for sub-scan feed amounts, thereby enabling all raster lines included in an effective recording area of the printing medium to be recorded.

7. A method in accordance with claim 6, wherein the plurality of different values used for the sub-scan feed amounts are selected in such a manner that remainders obtained by dividing the respective values by the element pitch k are fixed to a constant value.

8. A method in accordance with claim 6, wherein the plurality of different values used for the sub-scan feed amounts are selected in such a manner that the remainders obtained by dividing the respective values by the element pitch k are in a range of 2 to (k−2).

9. A method in accordance with claim 6, wherein, among a plurality of alternative sequences having an identical combination of the plurality of different values that are arranged in different orders, a sequence having smaller sub-scan feed amounts for a predetermined number of initial sub-scan feeds is selected to be used as a sequence of the different values for the sub-scan feed amounts.

10. A method in accordance with claim 6, wherein the step (b) comprises the step of driving the dot forming element array during each main scan at intermittent timings to disable dot formation for (s−1) dot positions among s consecutive dots in the main scanning direction where s is a predetermined integer of at least two; and wherein the number of effective dot-forming elements is a value obtained by dividing, by the integer s, a number of dot-forming elements which are actually used for recording among the plurality of dot-forming elements.

11. A computer program product storing a computer program for causing a printing apparatus to record dots on a surface of a printing medium while carrying out main scan in a direction substantially perpendicular to a sub-scanning direction, the printing apparatus comprising a dot recording head having a dot-forming element array including a plurality of dot-forming elements for forming a plurality of dots of an identical color arranged at a substantially constant pitch in the sub-scanning direction, the computer program product comprising:

a computer readable medium; and a computer program stored on the computer readable medium, wherein the computer program comprises:

a first program code that causes a computer system to drive the dot recording head according to a condition that a number of effective dot-forming elements and an element pitch k are set at integers which are no less than 2 and which are not relatively prime, the number of effective dot-forming elements representing a net number of raster lines in a main scanning direction which can be recorded by one main scan, the element pitch k representing a pitch of the plurality of dot-forming elements expressed in unit of a number of dots; and a second program code that causes the computer system to control the sub-scanning such that dot positions on each raster line are classified into one of more groups for recording and that each group of the dot positions are recorded using a sequence of a plurality of different values for sub-scan feed amounts, thereby enabling all raster lines included in an effective recording area of the printing medium to be recorded.

12. A dot recording apparatus in accordance with claim 2, wherein the plurality of different values used for the sub-scan feed amounts are selected in such a manner that the remainders obtained by dividing the respective values by the element pitch k are in a range of 2 to (k−2).

13. A dot recording apparatus in accordance with claim 2, wherein, among a plurality of alternative sequences having an identical combination of the plurality of different values that are arranged in different orders, a sequence having smaller sub-scan feed amounts for a predetermined number of initial sub-scan feeds is selected to be used as a sequence of the different values for the sub-scan feed amounts.

14. A dot recording apparatus in accordance with claim 3, wherein, among a plurality of alternative sequences having an identical combination of the plurality of different values that are arranged in different orders, a sequence having smaller sub-scan feed amounts for a predetermined number of initial sub-scan feeds is selected to be used as a sequence of the different values for the sub-scan feed amounts.

15. A dot recording apparatus in accordance with claim 2, wherein the control unit controls the head driving unit such that, the head driving unit drives the dot forming element array during each main scan at intermittent timings to disable dot formation for (s–1) dot positions among s consecutive dots in the main scanning direction where s is a predetermined integer of at least two; and wherein the number of effective dot-forming elements is a value obtained by dividing, by the integer s, a number of dot-forming elements which are actually used for recording among the plurality of dot-forming elements.

16. A dot recording apparatus in accordance with claim 3, wherein the control unit controls the head driving unit such that, the head driving unit drives the dot forming element array during each main scan at intermittent timings to disable dot formation for (s–1) dot positions among s consecutive dots in the main scanning direction where s is a predetermined integer of at least two; and wherein the number of effective dot-forming elements is a value obtained by dividing, by the integer s, a number of dot-forming elements which are actually used for recording among the plurality of dot-forming elements.

17. A dot recording apparatus in accordance with claim 4, wherein the control unit controls the head driving unit such that, the head driving unit drives the dot forming element array during each main scan at intermittent timings to disable dot formation for (s–1) dot positions among s consecutive dots in the main scanning direction where s is a predetermined integer of at least two; and wherein the number of effective dot-forming elements is a value obtained by dividing, by the integer s, a number of dot-forming elements which are actually used for recording among the plurality of dot-forming elements.

18. A method in accordance with claim 7, wherein the plurality of different values used for the sub-scan feed amounts are selected in such a manner that the remainders obtained by dividing the respective values by the element pitch k are in a range of 2 to (k–2).

19. A method in accordance with claim 7, wherein, among a plurality of alternative sequences having an identical combination of the plurality of different values that are arranged in different orders, a sequence having smaller sub-scan feed amounts for a predetermined number of initial sub-scan feeds is selected to be used as a sequence of the different values for the sub-scan feed amounts.

20. A method in accordance with claim 8, wherein, among a plurality of alternative sequences having an identical combination of the plurality of different values that are arranged in different orders, a sequence having smaller sub-scan feed amounts for a predetermined number of initial sub-scan feeds is selected to be used as a sequence of the different values for the sub-scan feed amounts.

* * * * *